US006633841B1

(12) United States Patent
Thyssen et al.

(10) Patent No.: US 6,633,841 B1
(45) Date of Patent: Oct. 14, 2003

(54) VOICE ACTIVITY DETECTION SPEECH CODING TO ACCOMMODATE MUSIC SIGNALS

(75) Inventors: Jes Thyssen, Laguna Niguel, CA (US); Adil Benyassine, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/526,017

(22) Filed: Mar. 15, 2000

Related U.S. Application Data

(60) Provisional application No. 60/146,435, filed on Jul. 29, 1999.

(51) Int. Cl.[7] ................................................ G10L 15/20

(52) U.S. Cl. ....................... 704/233; 704/207; 704/240; 704/219; 704/226; 704/220; 375/242; 375/243

(58) Field of Search .............................. 704/229, 200.1, 704/219, 220, 221, 223, 226, 500–504, 233, 240–242; 375/242, 243

(56) References Cited

U.S. PATENT DOCUMENTS

| | | | | | |
|---|---|---|---|---|---|
| 5,222,189 | A | * | 6/1993 | Fielder | 704/229 |
| 5,341,457 | A | * | 8/1994 | Hall et al. | 704/226 |
| 5,657,422 | A | * | 8/1997 | Janiszewski et al. | 704/229 |
| 5,659,622 | A | * | 8/1997 | Ashley | 381/94.1 |
| 5,778,335 | A | * | 7/1998 | Ubale et al. | 704/219 |
| 5,809,472 | A | * | 9/1998 | Morrison | 704/500 |
| 5,930,749 | A | | 7/1999 | Maes | |
| 6,028,890 | A | * | 2/2000 | Salami et al. | 375/216 |

(List continued on next page.)

FOREIGN PATENT DOCUMENTS

| | | | |
|---|---|---|---|
| EP | 0932141 | A2 | 7/1999 |
| FR | 2762464 | A | 10/1998 |
| WO | 98/27543 | | 6/1998 |
| WO | 00/31720 | | 6/2000 |

OTHER PUBLICATIONS

Vahatalo et al., ("Voice Activity Detection for GSM adaptive multi–rate codec", IEEE Workshop on Speech Coding Proceedings Model, Coders, and Error Criteria, Porvoo, Finland, Jun. 1999, pp. 55–57).*

(List continued on next page.)

*Primary Examiner*—Vijay Chawan
(74) *Attorney, Agent, or Firm*—Farjami & Farjami LLP

(57) ABSTRACT

An extended signal coding system that accommodates substantially music-like signals within a signal while maintaining a high perceptual quality in a reproduced signal during discontinued transmission (DTX) operation. The extended signal coding system contains internal circuitry that performs detection and classification of the speech signal, depending on numerous characteristics of the signal, to ensure the high perceptual quality in the reproduced signal. In certain embodiments of the invention, the signal is a speech signal, and the speech signal has a substantially music-like signal contained therein, and the extended signal coding system overrides any voice activity detection (VAD) decision that is used to determine which among a plurality of source coding modes are to be employed using a voice activity detection (VAD) correction/supervision circuitry. This is particularly relevant for discontinued transmission (DTX) operation. In certain embodiments of the invention, a signal coding circuitry maintains an improved perceptual quality in a coded signal having a substantially music-like component. This assurance of an improved perceptual quality is very desirable when there is a presence of a music-like signal in an un-coded signal.

27 Claims, 11 Drawing Sheets

U.S. PATENT DOCUMENTS

| | | | | | |
|---|---|---|---|---|---|
| 6,081,784 | A | * | 6/2000 | Tsutsui | 704/501 |
| 6,111,183 | A | * | 8/2000 | Lindemann | 84/633 |
| 6,240,386 | B1 | * | 5/2001 | Thyssen et al. | 704/220 |
| 6,401,062 | B1 | * | 6/2002 | Murashima | 704/223 |

OTHER PUBLICATIONS of Benyassine et al., ("ITU–T recommendation G.729 Annex B: A silence compression scheme for use with G.729 optimized fo V.70 digital simultaneous voice and data applications" IEEE Communications Magazine, US, IEEE Service Center, Piscatway, N.J., vol. 35.*

Antti Vahatalo and Ingemar Johansson, "Voice Activity Detection for GSM Adaptive Multi–Rate Codec," 1999 IEEE, pp. 55–57.

Adil Benyassine, Eyal Shlomot and Huan–Yu Su, "ITU–T Recommendation G.729 Annex B: A Silence Compression Scheme for Use with G.729 Optimized for V.70 Digital Simultaneous Voice and Data Applications," 1997 IEEE, pp. 64–73.

* cited by examiner

VOICE ACTIVITY DETECTION SPEECH CODING TO ACCOMMODATE MUSIC SIGNALS

CROSS-REFERENCE TO RELATED APPLICATIONS

The present application is based on U.S. Provisional Application Serial No. 60/146,435 entitled "Voice Activity Detection Speech Coding to Accommodate Music Signals", filed July 29, 1999.

BACKGROUND

1. Technical Field

The present invention relates generally to voice activity detection in speech coding; and, more particularly, it relates to voice activity detection that accommodates substantially music-like signals in speech coding.

2. Related Art

Conventional speech signal coding systems have difficulty in coding speech signals having a substantially music-like signal contained therein Conventional speech signal coding schemes often must operate on data transmission media having limited available bandwidth. These conventional systems commonly seek to minimize data transmission rates using various techniques that are geared primarily to maintain a high perceptual quality of speech signals. Traditionally, speech coding schemes were not directed to ensuring a high perceptual quality for speech signals having a large portion of embedded music-like signals.

The reasons for this were many in various communication systems employed on various media. One common reason, within speech coding. systems designed for wireless communication systems, was the fact that air time was prohibitively expensive. A user of a wireless communication system .was not realistically expected to wait "on hold" using his wireless device. Design constraints, such as economic constraints dictated by expensive air time, were among those constraints that directed those working in the art of speech coding and speech. processing not to devote significant energies to trying to maintain a high perceptual quality for speech signals having a substantially music-like signal contained therein. Conventional speech coding methods do not typically address the problem associated with trying to ensure a high perceptual quality for speech signals having a substantially music-like signal.

Another common reason that is presently applicable, within speech coding systems designed for wireline communication systems, is the fact that the bandwidth available for such communication systems was prohibited limited. Moreover, as such communication systems continue to grow in size and complexity, the communication system became more and more congested. Various techniques have been developed in the art of speech coding and speech processing to accommodate communication systems having limited bandwidth. The discontinued transmission method is one such example, known those having skill in the art of speech coding and speech processing, to maximize data transmission over already limited communication media.

Also, within the ITU-Recommendation G.729, an annex G.729E high rate extension has recently been adopted by the industry to assist the G.729 main body, and although the annex G.729E high rate extension provides increased perceptual quality for speech-like signals than does the G.729 main body, it especially improves the quality of coded speech signals having a substantially music-like signal embedded therein. However, traditional methods of performing voice activity detection (VAD), that are embedded within the annex G.729B discontinued transmission (DTX: (VAD, SID, CNG)), that also performs silence description coding (SID) and comfort noise generation (CNG), often improperly classify substantially music-like signals as background noise signals. In short, the annex G.729B discontinued transmission (DTX: (VAD, SID, CNG)) is simply inadequate to guarantee a high perceptual quality for substantially music-like signals. This is largely because the available data transmission rate (bit rate) is substantially lower than the annex G.729E high rate extension. The present implementation of the annex G.729E high rate extension accompanied by the annex G.729B discontinued transmission (DTX: (VAD, SID, CNG)) and its desirable voice activity detection simply fails to provide a high perceptual quality for substantially music-like signals.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in an extended speech coding system that accommodates substantially music-like signals within a speech signal while maintaining a high perceptual quality in a reproduced speech signal. The extended speech coding system contains internal circuitry that performs detection and classification of the speech signal, depending on numerous characteristics of the speech signal, to ensure the high perceptual quality in the reproduced speech signal. The invention selects an appropriate speech coding to accommodate a variety of speech signals in which the high perceptual quality is maintained.

In certain embodiments of the invention, for speech signal's having a substantially music-like signal, the extended speech coding system overrides any voice activity detection (VAD) decision, performed by a voice activity detection (VAD) correction/supervision circuitry, that is used to determine which among a plurality of source coding modes are to be employed. In one specific embodiment, the voice activity detection (VAD) correction/supervision circuitry cooperates with a conventional voice activity detection (VAD) circuitry to decide whether to use a discontinued transmission (DTX) speech signal coding mode, or a regular speech signal coding mode having a high rate extension speech signal coding mode.

In certain embodiments of the invention, a speech signal coding circuitry ensures an improved perceptual quality of a coded speech signal even during discontinued transmission (DTX). This assurance of a high perceptual quality is very desirable when there is a presence of a music-like signal in an un-coded speech signal.

Other aspects, advantages and novel features of the present invention will become apparent from the following detailed description of the invention when considered in conjunction with the accompanying drawings.

DETAILED DESCRIPTION

Figure 1:
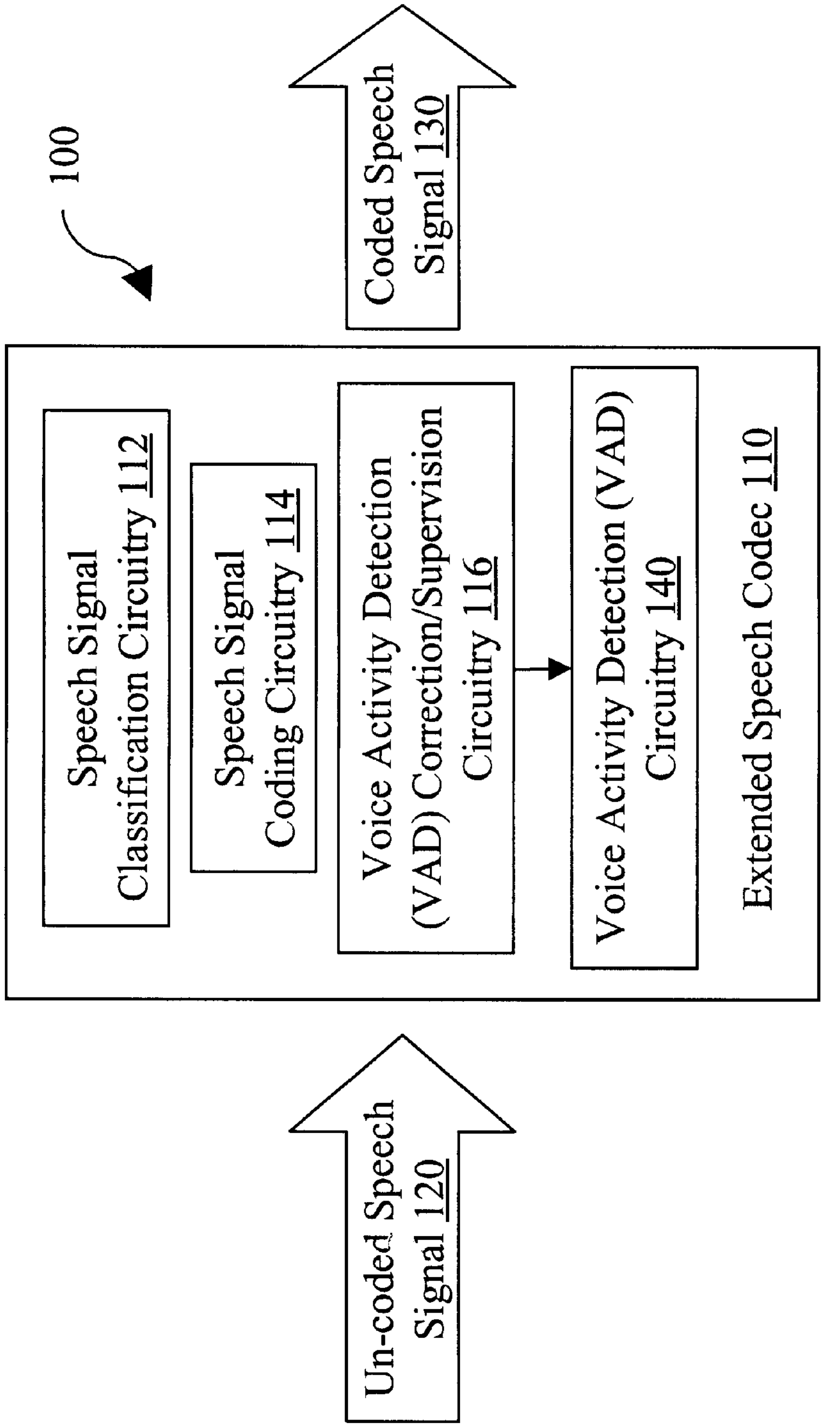
FIG. 1 is a system diagram illustrating an embodiment of an extended speech coding system built in accordance with the present invention.

FIG. 1 is a system diagram illustrating an embodiment of an extended speech coding system 100 built in accordance with the present invention. The extended speech coding system 100 contains an extended speech codec 110. The extended speech codec 110 received an un-coded speech signal 120 and generates a coded speech signal 130. To perform the generation of the coded speech signal 130 from the un-coded speech signal 120, the extended speech codec 110 employs, among other things, a speech signal classification circuitry 112, a speech signal coding circuitry 114, a voice activity detection (VAD) correction/supervision circuitry 116, and a voice activity detection (VAD) circuitry 140. The speech signal classification circuitry 112 identifies characteristics in the un-coded speech signal 120. Examples of characteristics in the un-coded speech signal 120 include the presence of a substantially music-like signal. The voice activity detection (VAD) correction/supervision circuitry 116 is used, in certain embodiments of the invention, to ensure the correct detection of the substantially music like signal within the un-coded speech signal 120. The voice activity detection (VAD) correction/supervision circuitry 116 is operable to provide direction to the voice activity detection (VAD) circuitry 140 in making any voice activity detection (VAD) decisions on the coding of the un-coded speech signal 120. Subsequently, the speech signal coding circuitry 114 performs the speech signal coding to generate the coded speech signal 130. The speech signal coding circuitry 114 ensures an improved perceptual quality in the coded speech signal 130 during discontinued transmission (DTX) operation, in particular, when there is a presence of the substantially music-like signal in the un-coded speech signal 120.

The un-coded speech signal 120 and the coded speech signal 130, within the scope of the invention, include a broader range of signals than simply those containing only speech. For example, if desired in certain embodiments of the invention, the un-coded speech signal 120 is a signal having multiple components included a substantially speech-like component. For instance, a portion of the un-coded speech signal 120 might be dedicated substantially to control of the un-coded speech signal 120 itself wherein the portion illustrated by the un-coded speech signal 120 is in fact the substantially un-coded speech signal 120 itself. In other words, the un-coded speech signal 120 and the coded speech signal 130 are intended to illustrate the embodiments of the invention that include a speech signal, yet other signals, including those containing a portion of a speech'signal, are included within the scope and spirit of the invention. Alternatively, the un-coded speech signal 120 and the coded speech signal 130 would include an audio signal component in other embodiments of the invention.

Figure 2:
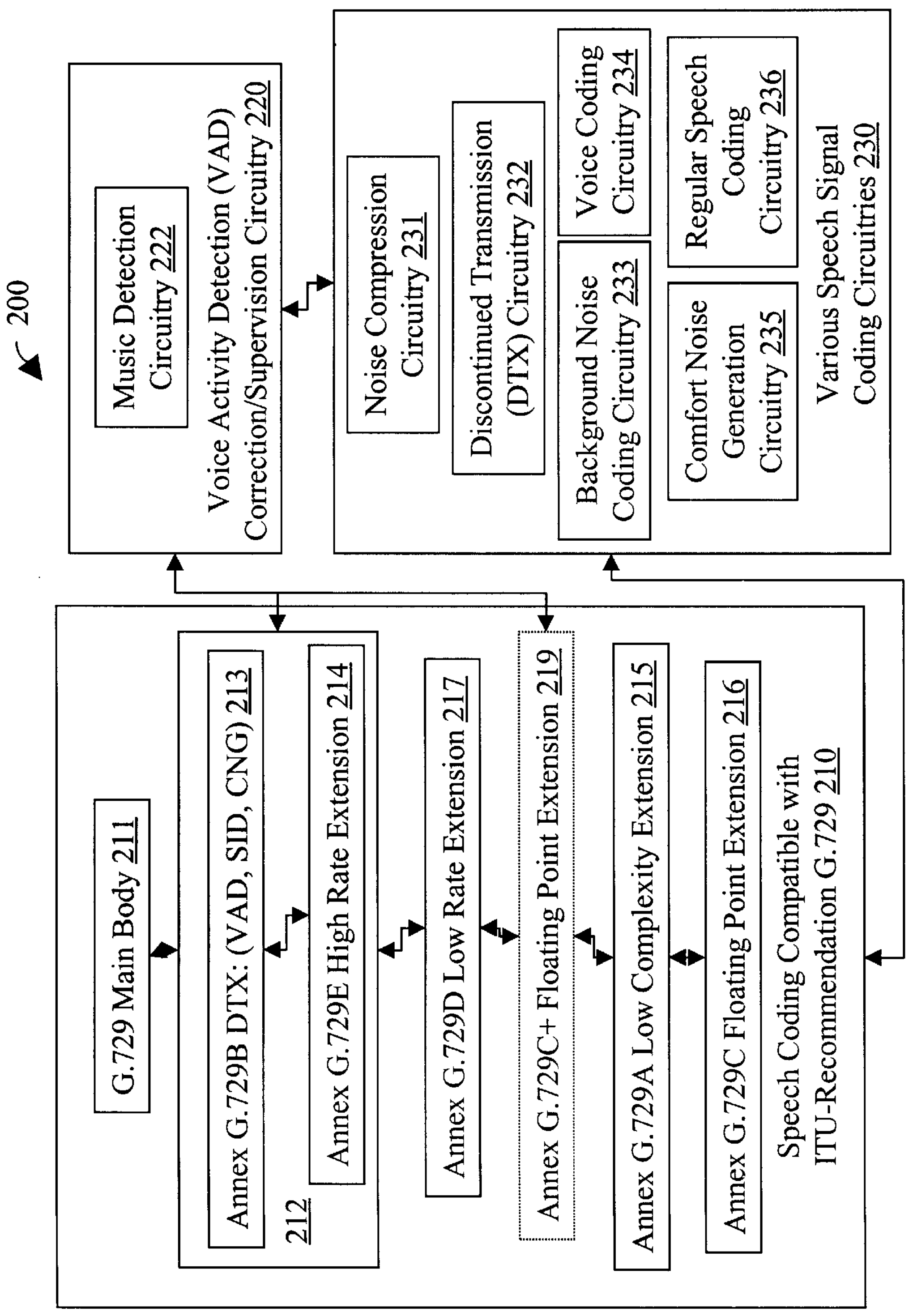
FIG. 2 is a system diagram illustrating an embodiment of a signal processing system built in accordance with the present invention.

FIG. 2 is a system diagram illustrating an embodiment of a signal processing system 200 built in accordance with the present invention. The signal processing system 200 contains, among other things, a speech coding compatible with ITU-Recommendation G.729 210, a voice activity detection (VAD) correction/supervision circuitry 220, and various speech signal coding circuitries 230. The speech coding compatible with ITU-Recommendation G.729 210 contains numerous annexes in addition to a G.729 main body 211. The speech coding compatible with ITU-Recommendation G.729 210 includes, among other things, an annex sub-combination 212 that itself contains an annex G.729B discontinued transmission (DTX: (VAD, SID, CNG)) 213 and an annex G.729E high rate extension 214, an annex G.729A low complexity extension 215, an annex G.729C floating point extension 216, an annex G.729D low rate extension 217, and an annex G.729C+ floating point extension 219.

The voice activity detection (VAD) correction/supervision circuitry 220 operates in conjunction with the annex sub-combination 212 that itself contains the annex G.729B discontinued transmission (DTX: (VAD, SID, CNG)) 213 and the annex G.729E high rate extension 214.

Also, the voice activity detection (VAD) correction/supervision circuitry 220 operates in conjunction with the annex G.729C+ floating point extension 219. The voice activity detection (VAD) correction/supervision circuitry 220 is, in certain embodiments of the invention, a voice activity detection circuitry that provides additional functionality, such as alternative operation upon the detection of a substantially music-like signal using a music detection circuitry 222 (described in further detail below), within the signal processing system 200.

All of the annexes described above provide additional performance characteristics to the G.729 main body 211, and are known to those having skill in the art of speech coding and speech processing. For example, the annex G.729B discontinued transmission (DTX: (VAD, SID, CNG)) 213 provides increased performance, in that, a lower data transmission rate is employed borrowing upon the discontinued transmission (DTX) mode of operation in the absence of active voiced speech in a speech signal. The annex G.729B discontinued transmission (DTX: (VAD, SID, CNG)) 213 itself performs voice activity detection, silence description coding, and comfort noise generation, known to those having skill in the art of speech coding and speech processing.

In certain embodiments of the invention, the voice activity detection (VAD) correction/supervision circuitry 220 performs the traditional voice activity detection of the annex G.729B discontinued transmission (DTX: (VAD, SID, CNG)) 213, in addition to its correction/supervision functions. The comfort noise generation circuitry 235 performs the comfort noise generation of the annex G.729B discontinued transmission (DTX: (VAD, SID, CNG)) 213. The discontinued transmission (DTX) circuitry 232 governs when to perform discontinued transmission (DTX) in accordance with the annex G.729B discontinued transmission (DTX: (VAD, SID, CNG)) 213.

The voice activity detection (VAD) correction/supervision circuitry 220 itself contains, among other things, a music detection circuitry 222. The music detection circuitry 222 operates to detect a substantially music-like signal in a speech signal that is processed using the signal processing system 200. The voice activity detection (VAD) correction/supervision circuitry 220 additional is capable to detect the presence of a substantially music-like signal in a speech signal. The various speech signal coding circuitries 230 operate within the signal processing system 200 to perform the actual speech coding of the speech signal in accordance with the invention and in accordance with the speech coding compatible with ITU-Recommendation G.729 210. The various speech signal coding circuitries 230 contain, among other things, a noise compression circuitry 231, a discontinued transmission (DTX) circuitry 232, a background noise coding circuitry 233, a voice coding circuitry 234, a comfort noise generation circuitry 235, and a regular speech coding circuitry 236. The various speech signal coding circuitries 230 are employed in certain embodiments of the invention to perform the speech signal coding dependent on various characteristics in the speech signal. Other methods of speech signal coding known to those having skill in the art or speech signal coding and speech signal processing are intended within the scope and spirit of the invention.

In certain embodiments of the invention, it is a classification that is performed by the various speech signal coding circuitries 230, in conjunction with the annex G.729E high rate extension 214, in determining whether the use of forward linear prediction coefficients or backward linear prediction coefficients are to be used to perform the speech coding, that is used to select the appropriate speech coding. This specific embodiment of the invention is further disclosed in a speech signal coding method 900, described in FIG. 9 below.

The voice activity detection (VAD) correction/supervision circuitry 220 of the signal processing system 200 is implemented, among other reasons, to overcome the problems associated with traditional voice activity detection circuitry that undesirably classifies substantially music-like signals as background noise signals. The voice activity detection (VAD) correction/supervision circuitry 220 operates using the annex G.729E high rate extension 214 and the annex G.729B discontinued transmission (DTX: (VAD, SID, CNG)) 213, thereby interfacing ideally with the speech coding compatible of the ITU-Recommendation G.729 210. The voice activity detection (VAD) correction/supervision circuitry 220 ensures, among other things, that the annex G.729E high rate extension 214 is allocated to handle signals having a substantially music-like characteristic. The voice activity detection (VAD) correction/supervision circuitry 220 intervenes in the event of an improper decision by a conventional voice activity detection (VAD) circuitry in wrongly classifying a substantially music-like signal as background noise. Depending upon the classification of a speech signal, using the annex G.729E high rate extension 214, and some additional statistical analysis that is performed dependent upon that classification, the voice activity detection (VAD) correction/supervision circuitry 220 is able to undo any wrong decisions performed by the conventional voice activity detection (VAD) circuitry and ensure that the annex G.729E high rate extension 214 accommodates any substantially music-like signals.

Figure 3A:
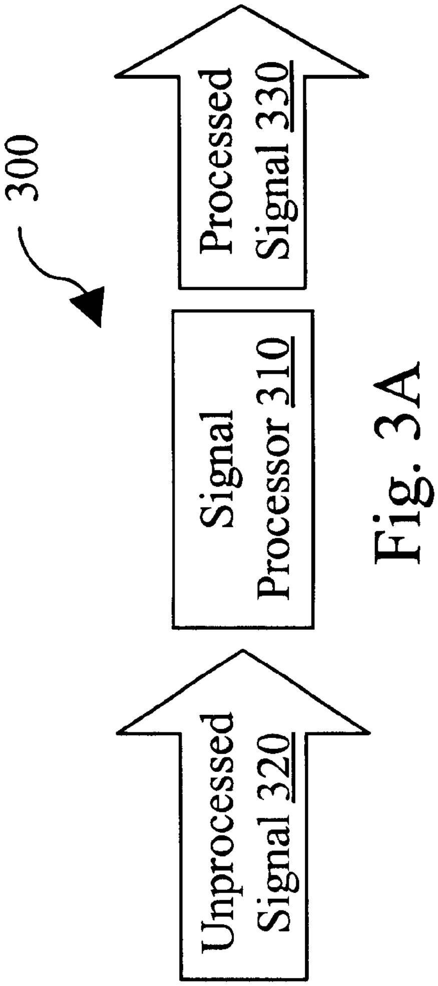
FIG. 3A is a system diagram illustrating an embodiment of a signal processing system built in accordance with the present invention.

FIG. 3A is a system diagram illustrating an embodiment of a signal processing system 300 built in accordance with the present invention. The signal processor 310 receives an unprocessed signal 320 and produces a processed signal 330.

In certain embodiments of the invention, the signal processor 310 is processing circuitry that performs the loading of the unprocessed signal 320 into a memory from which selected portions of the unprocessed signal 320 are processed in a sequential manner. The processing circuitry possesses insufficient processing capability to handle the entirety of the unprocessed signal 320 at a single, given time. The processing circuitry may employ any method known in the art that transfers data from a memory for processing and returns the processed signal 330 to the memory. In other embodiments of the invention, the speech processor 310 is a system that converts a signal into encoded data. The encoded data is then used to generate a reproduced signal comparable from the signal using signal reproduction circuitry. In other embodiments of the invention, the signal processor 310 is a system that converts encoded data, represented as the unprocessed signal 320, into the reproduced signal, represented as the processed signal 330. In other embodiments of the invention, the signal processor 310 converts encoded data that is already in a form suitable for generating a reproduced signal substantially comparable the original signal, yet additional processing is performed to improve the perceptual quality of the encoded data for reproduction.

The signal processing system 300 is, in some embodiments, the extended speech coding system 100 or, alternatively, the signal processing system 200 described. in the FIGS. 1 and 2. The signal processor 310 operates to convert the unprocessed signal 320 into the processed signal 330. The conversion performed by the signal processor 310 may be viewed as taking place at any interface wherein data must be converted from one form to another, i.e. from raw data to coded data, from coded data to a reproduced signal, etc.

The unprocessed signal 320 is illustrative of any type of signal employed within the scope and spirit of the invention. In certain embodiments of the invention, the unprocessed signal 320 is a signal having a substantially music-like component. In other embodiments of the invention, the unprocessed signal 320 is a signal having a substantially speech-like component. If desired, the unprocessed signal 320 is a signal transmitted via a landline or wireline network and the signal processor 310 operates on a predetermined portion of the unprocessed signal 320. Alternatively, the unprocessed signal 320 is transmitted via a wireless network and the signal processor 310 serves not only to convert the unprocessed signal 310 into a form suitable for signal processing using the signal processor 310, but it also performs any requisite signal processing on the unprocessed signal 320 to convert it into the processed signal 330. This requisite signal processing includes, in various embodiments of the invention, the identification of a substantially music-like component of the unprocessed signal 320. As mentioned above the unprocessed signal 320 and the processed signal 330 include any types of signals within the scope of the invention and those known in the art of signal transmission, signal processing, speech coding, speech signal processing, data storage, and data retrieval.

Figure 3B:
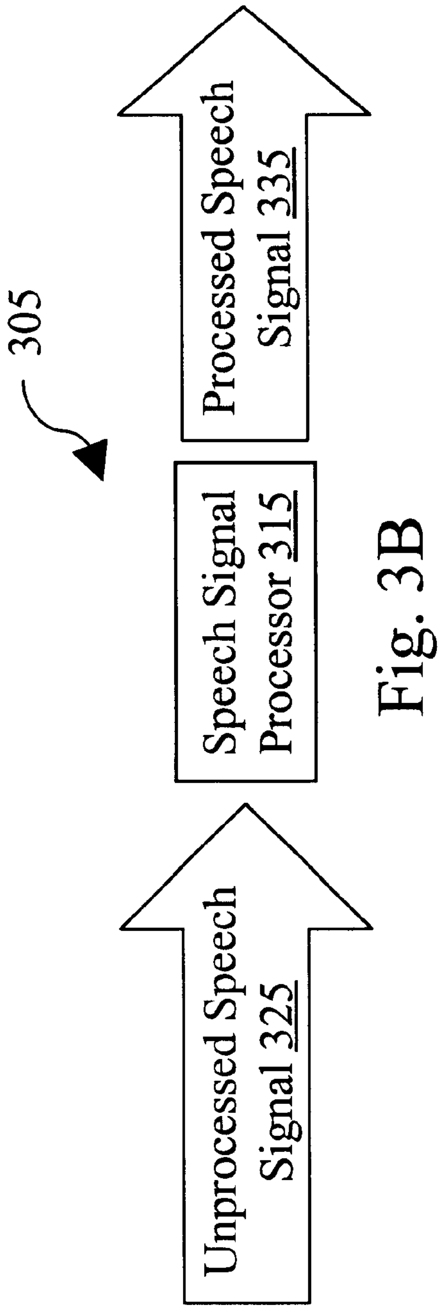
FIG. 3B is a system diagram illustrating an embodiment of a speech signal processing system built in accordance with the present invention.

FIG. 3B is a system diagram illustrating an embodiment of a speech signal processing system 305 built in accordance with the present invention. The speech signal processor 315 receives an unprocessed speech signal 325 and produces a processed speech signal 335.

In certain embodiments of the invention, the speech signal processor 315 is processing circuitry that performs the loading of the unprocessed speech signal 325 into a memory from which selected portions of the unprocessed speech signal 325 are processed in a sequential manner. The processing circuitry possesses insufficient processing capability to handle the entirety of the unprocessed speech signal 325 at a single, given time. The processing circuitry may employ any method known in the art that transfers data from a memory for processing and returns the processed speech signal 335 to the memory. In other embodiments of the invention, the speech signal processor 315 is a system that converts a speech signal into encoded speech data. The encoded speech data is then used to generate a reproduced speech signal comparable from the speech signal using speech reproduction circuitry. In other embodiments of the invention, the speech signal processor 315. is a system that converts encoded speech data, represented as the unprocessed speech signal 325, into the reproduced speech signal, represented as the processed speech signal 335. In other embodiments of the invention, the speech signal processor 315 converts encoded speech data that is already in a form suitable for generating a reproduced speech signal substantially comparable the speech signal, yet additional processing is performed to improve the perceptual quality of the encoded speech data for reproduction.

The speech signal processing system 305 is, in some embodiments, the extended speech coding system 100 or, alternatively, the signal processing system 200 described in the FIGS. 1 and 2. The speech signal processor 315 operates to convert the unprocessed speech signal 325 into the processed speech signal 335. The conversion performed by the speech signal processor 315 may be viewed as taking place at any interface wherein data must be converted from one form to another, i.e. from speech data to coded speech data, from coded data to a reproduced speech signal, etc.

Figure 4A:
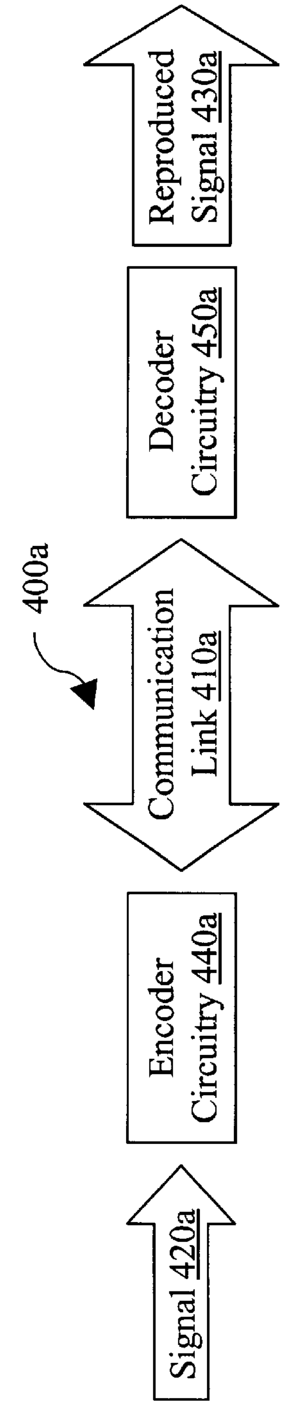
FIG. 4A is a system diagram illustrating an embodiment of a signal codec built in accordance with the present invention that communicates across a communication link.

FIG. 4A is a system diagram illustrating an embodiment of a signal codec 400*a* built in accordance with the present invention that communicates across a communication link 410*a*. A signal 420*a* is input into an encoder circuitry 440*a* in which it is coded for data transmission via the communication link 410*a* to a decoder circuitry 450*a*. The decoder circuitry 450*a* converts the coded data to generate a reproduced signal 430*a* that is substantially comparable to the signal 420*a*.

Figure 5:
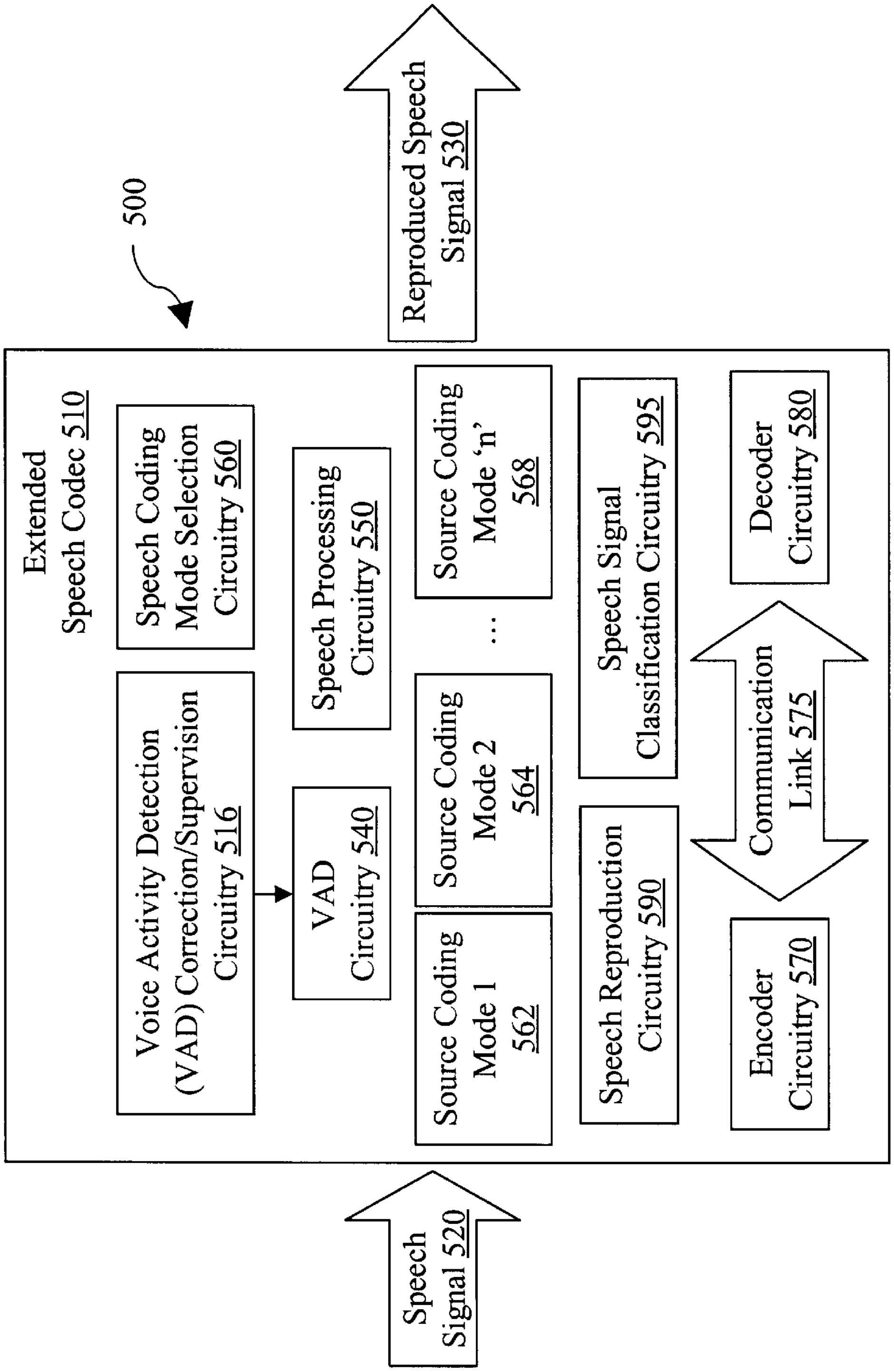
FIG. 5 is a system diagram illustrating a specific embodiment of a speech coding system built in accordance with the present invention that performs speech signal classification and selects from among a plurality of source coding modes dependent on the speech signal classification.

In certain embodiments of the invention, the decoder circuitry 450*a* includes signal reproduction circuitry (one such example being a speech reproduction circuitry 590 of FIG. 5). Similarly, the encoder circuitry 440*a* includes selection. circuitry (one such example being a speech coding mode selection circuitry 560 of FIG. 5). that selects from a plurality of coding modes (such as a source coding mode 1 562, a source coding mode 2 564, and a source coding mode 'n' 568 of FIG. 5). The communication link 410*a* is either a wireless or a wireline. communication link without departing from the scope and spirit of the invention. The encoder circuitry 440*a* identifies at least one characteristic of the signal 420*a* and selects an appropriate speech signal coding scheme depending on the at least one characteristic. The at least one characteristic is a substantially music-like signal in certain embodiments of the invention. The signal codec 400*a* is, in one embodiment, a multi-rate speech codec that performs speech coding and speech decoding on the signal 420*a* using the encoder circuitry 440*a* and the decoder circuitry 450*a*.

Figure 4B:
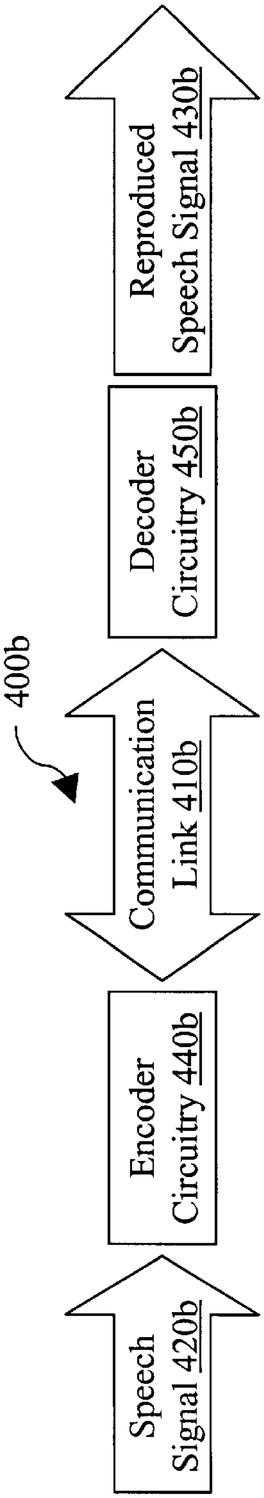
FIG. 4B is a system diagram illustrating an embodiment of a speech signal codec built in accordance with the present invention that communicates across a communication link.

FIG. 4B is a system diagram illustrating an embodiment of a speech codec 400*b* built in accordance with the present invention that communicates across a communication link 410*b*. A speech signal 420*b* is input into an encoder circuitry 440*b* where it is coded for data transmission via the communication link 410*b* to a decoder circuit 450*b*. The decoder circuitry 450*b* converts the coded data to generate a reproduced speech signal 430*b* that is substantially comparable to the speech signal 420*b*.

In certain embodiments of the invention, the decoder circuitry 450*b* includes speech reproduction circuitry (one such example being a speech reproduction circuitry 590 of FIG. 5). Similarly, the encoder circuitry 440*b* includes selection circuitry (one such example being a speech coding mode selection circuitry 560 of FIG. 5) that selects from a plurality of coding modes (such as a source coding mode 1 562, a source coding mode 2 564, and a source coding mode 'n' 568 of FIG. 5). The communication link 410*b* is either a wireless or a wireline communication link without departing from the scope and spirit of the invention. The encoder circuitry 440*b* identifies at least one characteristic of the speech signal and selects an appropriate speech signal coding scheme depending on the at least one characteristic. The at least one characteristic is a substantially music-like signal in certain embodiments of the invention. The speech codec 400*b* is, in one embodiment, a multi-rate speech codec that performs speech coding on the speech signal 420*b* using the encoder circuitry 440*b* and the decoder circuitry 450*b*.

Figure 4C:
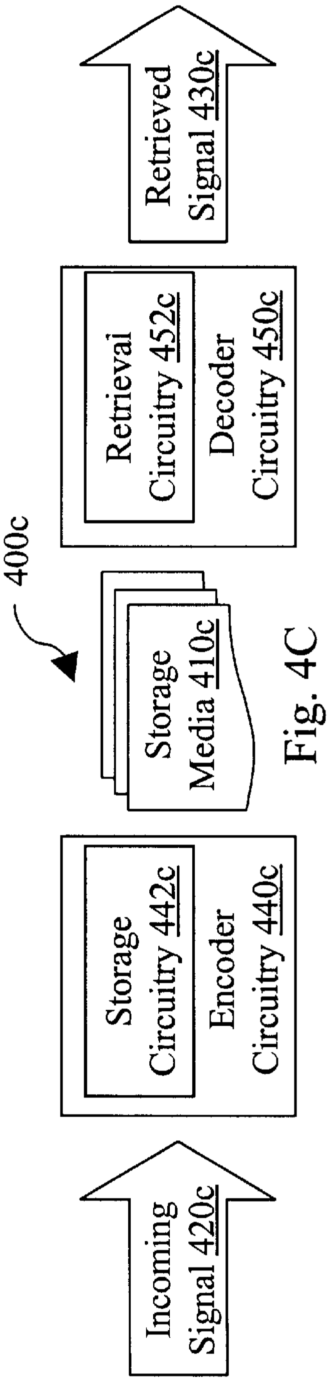
FIG. 4C is a system diagram illustrating an embodiment of a signal storage and retrieval system built in accordance with the present invention that stores a signal to a storage media and retrieves the signal from the storage media.

FIG. 4C is a system diagram illustrating an embodiment of a signal storage and retrieval system 400*c* built in accordance with the present invention that stores an incoming signal 420*c* to a storage media 410*c* and retrieves the signal from the storage media 410*c*. The incoming signal 420*c* is input into an encoder circuitry 440*c* in which it is coded for storage into the storage media 410*c*. The encoder circuitry 440c itself contains a storage circuitry 442c that assists in the coding of the incoming signal 420c for storing into the storage media 410c. A decoder circuitry. 450c is operable to retrieve the signal that has been stored on the storage media 410c. The decoder circuitry 450c itself contains a retrieval circuitry 452c that assists in the retrieval of the signal stored on the storage media 410c. The decoder circuitry 450c converts and decodes the coded data to generate a retrieved signal 430c that is substantially comparable to the incoming signal 420c.

Using the encoder circuitry 440c and the storage circuitry 442c contained therein, various operations are performed on the incoming signal 420c such as compression, encoding, and other operations known in the art of signal coding and storing without departing from the scope and spirit of the embodiment of the invention illustrated in the FIG. 4C. Similarly, the decoder circuitry 450c and the retrieval circuitry 452c contained therein perform various operations on the signal stored on the storage media 410c in response to the compression, encoding, and other operations performed on the incoming signal 420c prior to its storing on the storage media 410c. That is to say, depending on what is performed to the incoming signal 410c to enable its storage on the storage media 410c, the decoder circuitry 450c is operable to convert and decode the stored signal back into a form such that the retrieved signal 430c is substantially comparable to the incoming signal 420c.

In certain embodiments of the invention, the encoder circuitry 440c includes selection circuitry (one such example being a speech coding mode selection circuitry 560 of FIG. 5) that selects from a plurality of coding modes (such as a source coding mode 1 562, a source coding mode 2 564, and a source coding mode 'n' 568 of FIG. 5).

The storage media 410c is any number of media operable for storing various forms of data. For example, the storage media 410c is a computer hard drive in some embodiments of the invention. In others, the storage media 410c is a read only memory (RAM), a random access memory (RAM), or a portion of storage space on a computer network. The computer network is an intranet network or an internet network in various embodiments of the invention. The encoder circuitry 440c identifies at least one characteristic of the incoming signal 420c and selects an appropriate signal coding scheme depending on the at least characteristic. The at least one characteristic of the incoming signal 420c is a substantially music-like signal in certain embodiments of the invention. The signal storage and retrieval system 400c is, in one embodiment, a multi-rate speech codec that performs speech coding on the incoming signal 420c using the encoder circuitry 440c and the decoder circuitry 450c. The incoming signal 420c is properly processed into a suitable form for storage within the storage media 410c, and the retrieved signal 430c is in a form suitable for any variety of applications including transmission, reproduction, re-play, broadcast, and any additional signal processing that is desired in a given application.

FIG. 5 is a system diagram illustrating a specific embodiment of a speech coding system 500 built in accordance with the present invention that performs speech signal classification and selects from among a plurality of source coding modes dependent on the speech signal classification. FIG. 5 illustrates one specific embodiment of the speech coding system 500 having an extended speech codec 510 built in accordance with the present invention that selects from among a plurality of source coding modes (shown as a source coding mode 1 562, a source coding mode 2 564, and a source coding mode 'n' 568) using a speech coding mode selection circuitry 560. The extended speech codec 510 contains an encoder circuitry 570 and a decoder circuitry 580 that communicate via a communication link 575. The extended speech codec 510 takes in a speech signal 520 and classifies the speech signal 520 using a voice activity detection (VAD) circuitry 540. The voice activity detection (VAD) circuitry 540 then employs a voice activity detection (VAD) correction/supervision circuitry 516 to detect the existence of a substantially music-like signal in the speech signal 520 that has been improperly classified by the voice activity detection (VAD) circuitry 540. From certain perspectives, the voice activity detection (VAD) correction/supervision circuitry 516 is the voice activity detection (VAD) correction/supervision circuitry 116 of FIG. 1 or the voice activity detection (VAD) correction/supervision circuitry 220 of FIG. 2 as described above in the various embodiments of the invention. In other embodiments of the invention, the extended speech codec 510 takes in a speech signal 520 and identifies an existence of a substantially music-like signal using a speech signal classification circuitry 595.

The speech coding mode selection circuitry 560 uses the detection of the substantially music-like signal in selecting which source coding mode of the source coding mode 1 562, the source coding mode 2 564, and the source coding mode 'n' 568 to employ in coding the speech signal 520 using the encoder circuitry 570. In other embodiments of the invention, the extended speech codec 510 detects other characteristics of the speech signal 520 includes a speech processing circuitry 550 to assist in the coding of the speech signal that is substantially performed using the encoder circuitry 570. The coding of the speech signal includes source coding, signaling coding, and channel coding for transmission across the communication link 575. After the speech signal 520 has been coded and transmitted across the communication link 575, and it is received at the decoder circuitry 580, the speech reproduction circuit 590 serves to generate a reproduced speech signal 530 that is substantially comparable to the speech signal 520.

The extended speech codec 510 is, in one embodiment, a multi-rate speech codec that performs speech signal coding to the speech signal 520 using the encoder processing circuit 570 and the decoder processing circuit 580. The speech signal 520 contains a substantially music-type signal and the reproduced speech signal 530 reproduces the substantially music-type signal such that it is substantially comparable to the substantially music-type signal contained within the speech signal 520. The speech coding involves detecting the presence of the substantially music-like signal in the speech signal 520 using the voice activity detection (VAD) correction/supervision circuitry 516 and selecting an appropriate speech signal transmission rate in accordance with the invention as described in FIGS. 1, 2, 3 and 4. In certain embodiments of the invention, the highest data transmission rate is one of the source coding modes (shown as a source coding mode 1 562, a source coding mode 2 564, and a source coding mode 'n' 568) that is selected using the speech coding mode selection circuitry 560. As described in the embodiments above, the communication link 575 is a wireless communication link or a wireline communication link without departing from the scope and spirit of the invention.

Figure 6B:
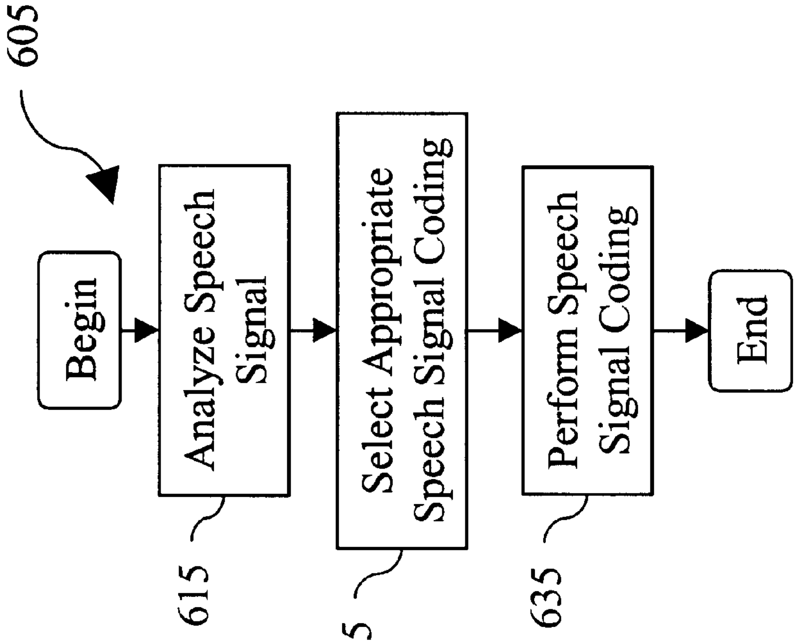
FIG. 6B is a functional block diagram illustrating a speech signal coding method performed in accordance with the present invention.
Figure 6A:
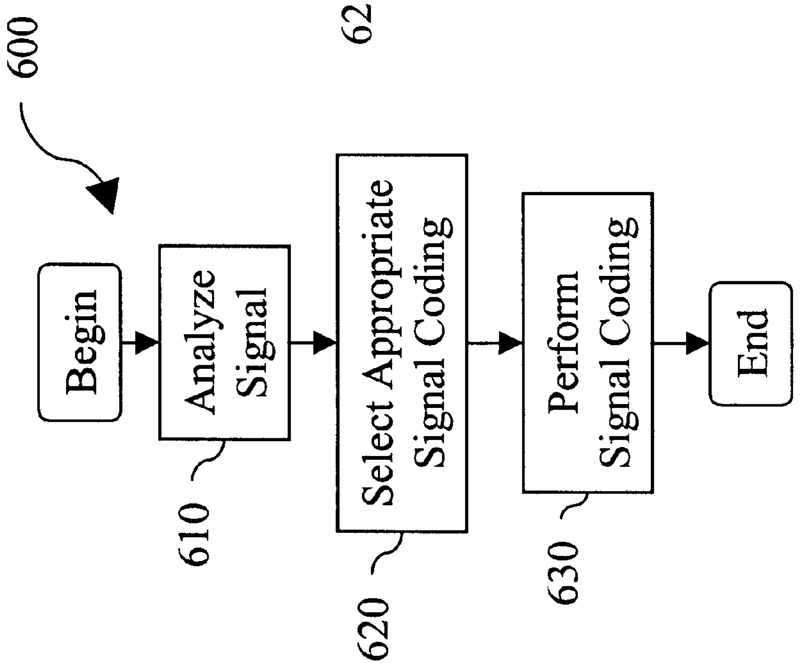
FIG. 6A is a functional block diagram illustrating a signal coding method performed in accordance with the present invention.

FIG. 6A is a functional block diagram illustrating a signal coding method 600 performed in accordance with the present invention. The signal coding method 600 selects an appropriate coding scheme depending on the identified characteristic of a signal. In a block 610, the signal is analyzed to identify at least one characteristic. In a block

620, the at least one characteristic that was identified in the block 610 is used to select an appropriate signal coding scheme for the signal. In a block 630, the coding scheme parameters that were selected in the block 620 are used to perform the signal coding.

The signal coding of the block 630 includes, but is not limited to, source coding, signaling coding, and channel coding in certain embodiments of the invention. In other embodiments of the invention, the signal coding of the block 630 is data coding to prepare the signal for storage into a storage media. The signal coding method 600 identifies a substantially music-like signal within the block 610; the substantially music-like signal contained within the signal is identified within the analysis performed within the block 610. In certain embodiments of the invention, the signal coding method 600 is performed using a multi-rate speech codec wherein the coding parameters are transmitted from an encoder circuitry to a decoder circuitry, such as the encoder circuitry 570 and the decoder circuitry 580 illustrated within the FIG. 5. If desired, the coding parameters are transmitted using the communication link 575 (also shown in the FIG. 5). Alternatively, the coding parameters are transmitted across any communication medium.

FIG. 6B is a functional block diagram illustrating a speech signal coding method 605 performed in accordance with the present invention. The speech coding method 605 selects an appropriate coding scheme depending on the identified characteristics of a speech sign block 615, the speech signal is analyzed to identify at least one characteristic. Examples of characteristics include pitch, intensity, periodicity, a substantially speech-like signal, a substantially music-like signal, or other characteristics familiar to those having skill in the art of speech processing. In a block 625, the at least one characteristic that was identified in the block 615 is used to select an appropriate coding scheme for the speech signal. In a block 635, the coding scheme parameters that were selected in the block 625 are used to perform speech signal coding.

The speech signal coding of the block 635 includes, but is not limited to, source coding, signaling coding, and channel coding in certain embodiments of the invention. The speech coding method 605 identifies a substantially music-like signal within the block 615. In certain embodiments of the invention, the speech coding method 605 is performed using a multi-rate speech codec wherein the coding parameters are transmitted from an encoder circuitry to a decoder circuitry, such as the encoder circuitry 570 and the decoder circuitry 580 of FIG. 5. If desired, the coding parameters are transmitted using a communication link 575 (FIG. 5). Alternatively, the coding parameters are transmitted across any communication medium.

Figure 7A:
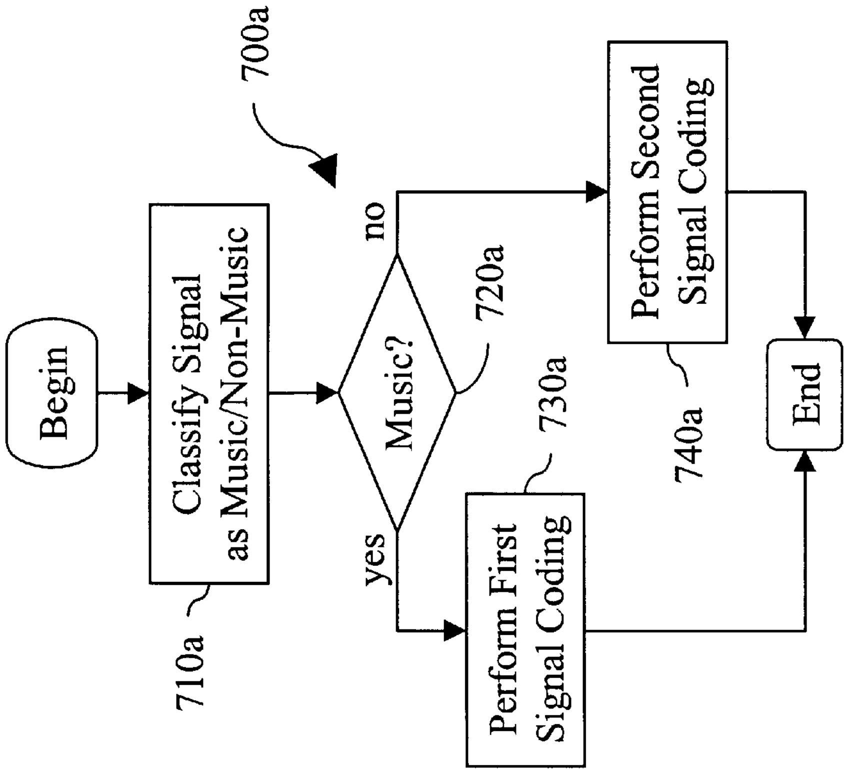
FIG. 7A is a functional block diagram illustrating a signal coding method performed in accordance with the present invention that selects from among a first signal coding scheme and a second signal coding scheme.

FIG. 7A is a functional block diagram illustrating a signal coding method 700*a* performed in accordance with the present invention that selects from among a first signal coding scheme and a second signal coding scheme. In particular, FIG. 7A illustrates a signal coding method 700*a* that classifies a signal as having either a substantially music-like characteristic or a substantially non-music-like characteristic in a block 710*a*. Depending upon the classification performed in the block 710*a*, one of either a first signal coding scheme 730*a* or a second signal coding scheme 740*a* is performed to code the signal as determined by the decision of a decision block 720*a*. In other embodiments of the invention, more than two coding schemes are included in the present invention without departing from the scope and spirit of the invention. Selecting between various coding schemes is performed using the decision block 720*a* in which the existence of a substantially music-like signal, as determined by using a voice activity detection (VAD) circuitry such as the voice activity detection (VAD) correction/supervision circuitry 516 of FIG. 5, serves to classify the signal as either having the substantially music-like characteristic or the substantially non-music-like characteristic.

In the signal coding method 700*a*, the classification of the signal as having either the substantially music-like characteristic or the substantially non-music-like characteristic, as determined by the block 710*a*, serves as the primary decision criterion, as shown in the decision block 720*a*, for performing a particular coding scheme. In certain embodiments of the invention, the classification performed in the block 710*a* involves applying a weighted filter to the speech signal. Other characteristics of the signal are identified in addition to the existence of the substantially music-like signal. The other characteristics include speech characteristics such as pitch, intensity, periodicity, or other characteristics familiar to those having skill in the art of signal processing focused specifically on speech signal processing.

Figure 7B:
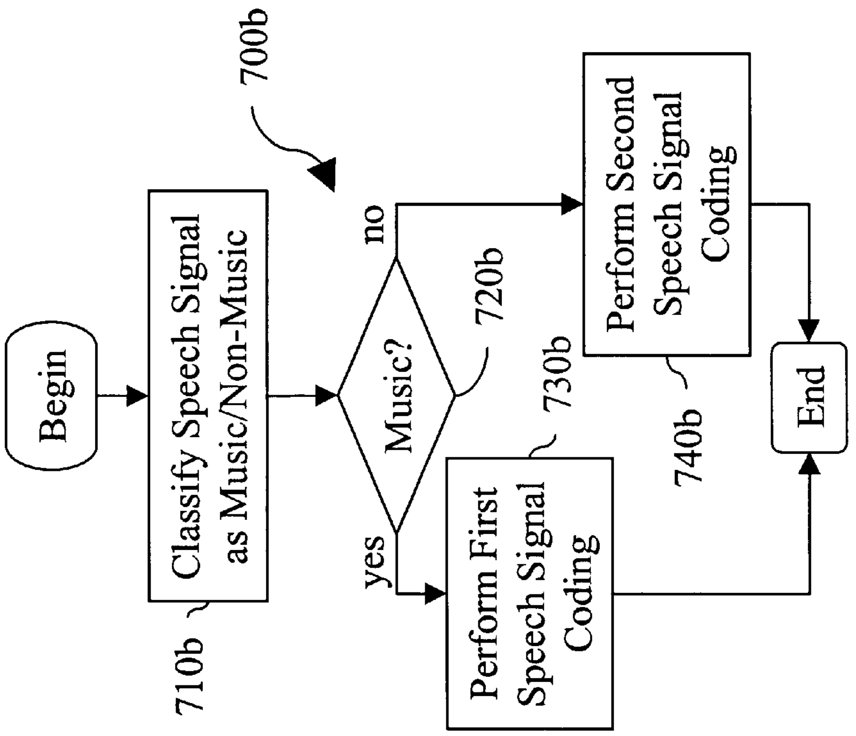
FIG. 7B is a functional block diagram illustrating a speech signal coding method performed in accordance with the present invention that selects from among a first speech signal coding scheme and a second speech signal coding scheme.

FIG. 7B is a functional block diagram illustrating a speech signal coding method 700*b* performed in accordance with the present invention that selects from among a first speech signal coding scheme and a second speech signal coding scheme. In particular, FIG. 7B illustrates a speech signal coding method 700*b* that classifies a speech signal as having either a substantially music-like characteristic or a substantially non-music-like characteristic in a block 710*b*. Depending up on the classification performed in the block 710*b*, one of either a first speech signal coding scheme 730*b* or a second speech signal coding scheme 740*b* is performed to code the speech signal as determined by a decision block 720*b*. In other embodiments of the invention, more than two coding schemes are included in the present invention without departing. from the scope and spirit of the invention. Selecting between various coding schemes is performed using the decision block 720*b* in which the existence of a substantially music-like signal, as determined by using a voice activity detection circuit such as the voice activity detection (VAD) correction/supervision circuitry 516 of FIG. 5, serves to classify the speech signal as either having the substantially music-like characteristic or the substantially non-music-like characteristic.

In the speech coding method 700*b*, the classification of the speech signal as having either the substantially music-like characteristic or the substantially non-music-like characteristic, as determined by the block 710*b*, serves as the primary decision criterion, as shown in the decision block 720*b*, for performing a particular coding scheme. In certain embodiments of the invention, the classification performed in the block 710*b* involves applying a weighted filter to the speech signal. Other characteristics of the speech signal are identified in addition to the existence of the substantially music-like signal. The other characteristics include speech characteristics such as pitch, intensity, periodicity, or other characteristics familiar to those having skill in the art of speech signal processing.

Figure 8:
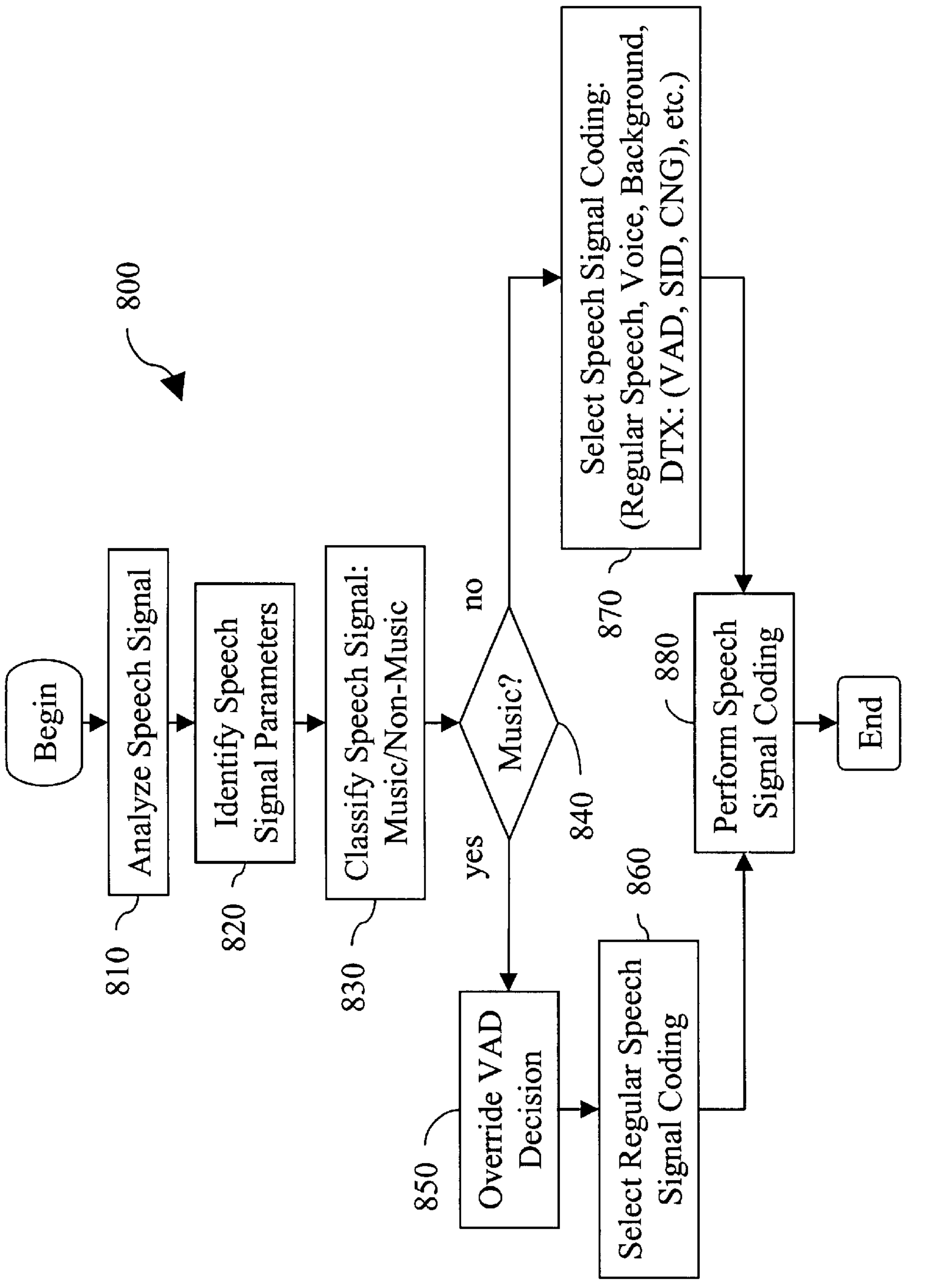
FIG. 8 is a functional block diagram illustrating a speech signal coding method that performs speech signal coding, dependent upon the speech signal's classification as being either substantially music-like or substantially non-music-like, in accordance with the present invention.

FIG. 8 is a functional block diagram illustrating a speech signal coding method 800 that performs speech signal coding, dependent upon the speech signal's classification as being either substantially music-like or substantially non-music-like, in accordance with the present invention. The speech signal is analyzed in a block 810. In certain embodiments of the invention, the analysis of the block 810 is performed using a perceptual weighting filter or weighting filter applied to non-perceptual characteristics of the speech signal. In a block 820, speech parameters of the speech signal are identified. Such speech parameters may include pitch information, intensity, periodicity, a substantially speech-like signal, a substantially music-like signal, or other characteristics familiar t o those having skill in the art of speech coding and speech signal processing.

In this particular embodiment of the invention, a block 830 determines whether the speech signal has either a substantially music-like characteristic or a substantially non-music-like characteristic, and the speech signal is classified accordingly. The block 830 uses the identified speech signal parameters extracted from the speech signal in the block 820. These speech signal parameters are processed to determine whether the speech signal has either the substantially music-like characteristic or the substantially non-music-like characteristic, and the speech signal is classified according to this determination. A decision block 840 directs the speech coding method 800 to select a speech signal coding from among a predetermined number of methods to perform speech signal coding, as shown in a block 870. Certain examples of methods to perform speech signal coding in the block 870 include, but are not limited to, regular speech signal coding, substantially voice-like speech signal coding, substantially background-noise-like speech signal coding, discontinued transmission (DTX) speech signal coding which itself included voice activity detection (VAD), silence description coding (SID), and comfort noise generation (CNG) speech signal coding. The selection a speech signal coding, as shown in the block 870, is performed on speech signals not having a substantially music-like signal. Subsequently, the speech signal coding is actually performed in a block 880. Alternatively, if the speech signal is found to have a substantially music-like signal, as decided in the decision block 840, any voice activity detection (VAD) decision that is employed in the speech signal coding method 800 is overridden in a block 850. In a block 860, the speech signal is coded using a selected regular speech signal coding, irrespective of any other characteristics of the speech signal. The regular speech signal coding that is selected in the block 860 maintains a high perceptual quality of the speech signal, even in the presence of a substantially music-like signal in the speech signal that is classified in the block 830. Subsequently, the speech signal coding is actually performed in the block 880.

Figure 9:
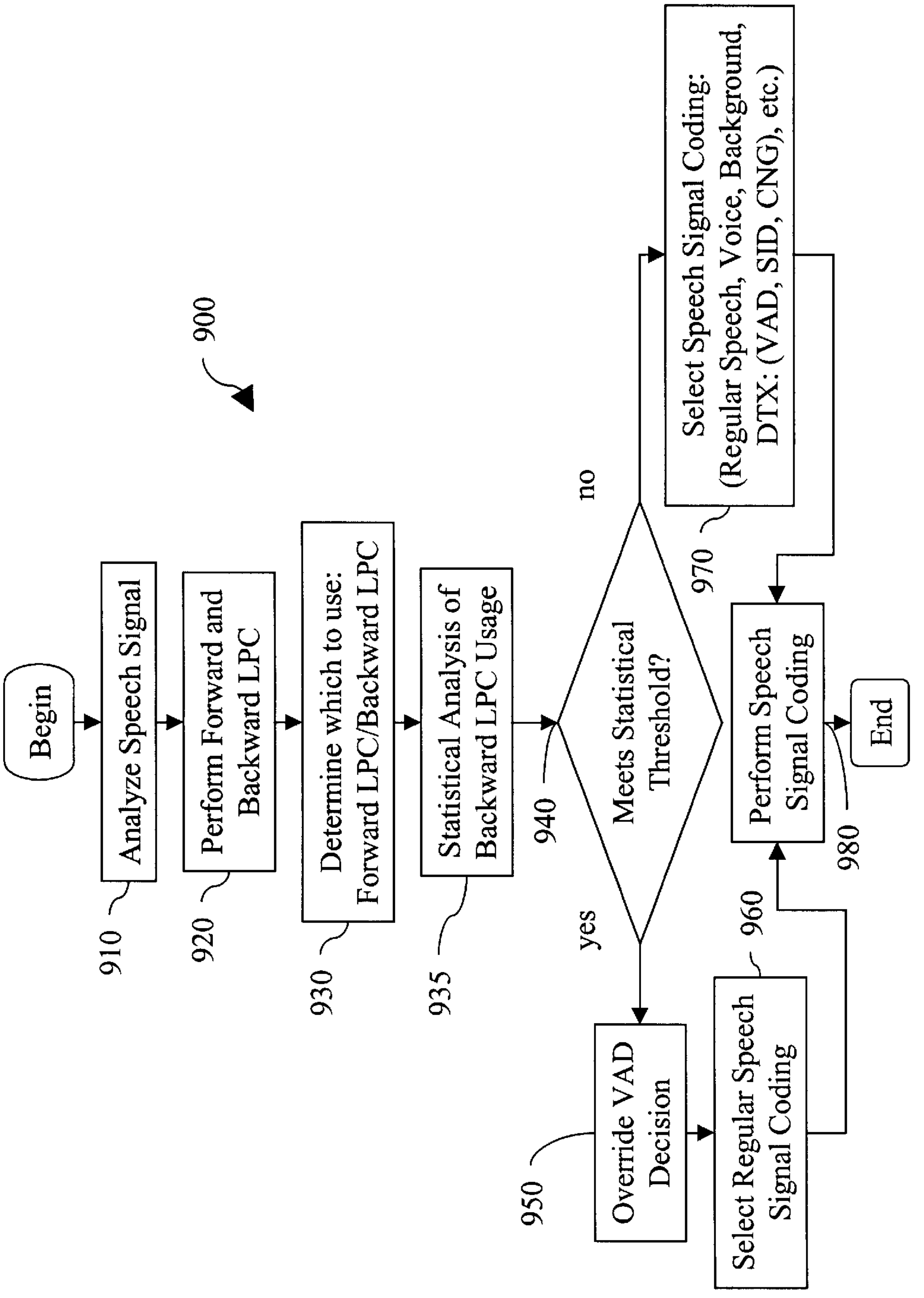
FIG. 9 is a functional block diagram illustrating a speech signal coding method that performs speech signal coding, dependent upon the statistical analysis of the use of either forward linear prediction coefficients or backward linear prediction coefficients, in accordance with the present invention.

FIG. 9 is a functional block diagram illustrating a speech signal coding method 900 that performs speech signal coding, dependent upon the statistical analysis of the use of either forward linear prediction coefficients or backward linear prediction coefficients, in accordance with the present invention. The speech signal is analyzed in a block 910. In certain embodiments of the invention, the analysis of the block 910 is performed using a perceptual weighting filter or weighting filter applied to non-perceptual characteristics of the speech signal. In a block 920, forward linear prediction and backward linear prediction is performed on the speech signal.

In this particular embodiment of the invention, a block. 930 determines whether the forward linear prediction or the backward linear prediction is to be used to perform the speech signal coding of the speech signal. Subsequently, in a block 935, statistical analysis of the backward linear prediction usage is performed against a predetermined threshold. In certain embodiments of the invention, an output flag is generated within the block 930 that indicates the usage of either forward linear prediction or backward linear prediction. In certain embodiments of the invention, this statistical analysis of the usage of the backward linear prediction is performed over a window of a predetermined number of N consecutive frames of the speech signal. A predetermined number of '64' frames is optimal in certain applications of the invention. A decision block 940 directs the speech coding method 900 to select a speech signal coding from among a predetermined number of methods to perform speech signal coding, as shown in a block 970 if the predetermined statistical threshold that is determined in the block 935 is met. Certain examples of methods to perform speech signal coding in the block 970 include, but are not limited to, regular speech signal coding, substantially voice-like speech signal coding, substantially background-noise-like speech signal coding, discontinued transmission (DTX) speech signal coding which itself included voice activity detection (VAD), silence description coding (SID), and comfort noise generation (CNG) speech signal coding. Subsequently, the speech signal coding is actually performed in a block 980.

Alternatively, if the statistical analysis of the usage of the backward linear prediction, as determined in the block 935, meets the predetermined statistical threshold as decided in the decision block 940, any voice activity detection (VAD) decision that is employed in the speech signal coding method 900 is overridden in a block 950. In a block 960, the speech signal is coded using a selected regular speech signal coding, irrespective of any other characteristics of the speech signal. The regular speech signal coding that is selected in the block 960 maintains a high perceptual quality of the speech signal, even in the presence of a substantially music-like signal in the speech signal. Subsequently, the speech signal coding is actually performed in the block 880.

One particular method of employing the invention as described above is to utilize the following computer code, written in the C programming language. The C programming language is well known to those having skill in the art of speech coding and speech processing. In certain embodiments, the following C programming language code is performed within the blocks 830, 840, and 850 of FIG. 8. Alternatively, the following C programming language code is performed within the blocks 935, 940, and 950 of FIG. 9.

```
void musdetect (
      int en__mode,
      int stat__flg,
      int frm__count,
      int *Vad)
{
int i;
static int count__music=0;
static FLOAT Mcount__music=0.0;
static int count__consc=0;
if( stat__flg== 1 && (*Vad == 1) )
   count__music++;
if ((frm__count%64) == 0 ) {
   if( frm__count == 64)
   Mcount__music = count__music;
   else
   Mcount__music = 0.9*Mcount__music + 0.1*count__music;
}
if( count__music == 0)
   count__consc++;
else
   count__consc = 0;
if( count__consc > 500) Mcount__music = 0.0;
if ((frm__count%64) == 0)
   count__music = 0;
if( (Mcount__music >= 5.0 || frm__count < 64) && (en__mode == 0))
   *Vad = 1;
}
```

Figure 10:
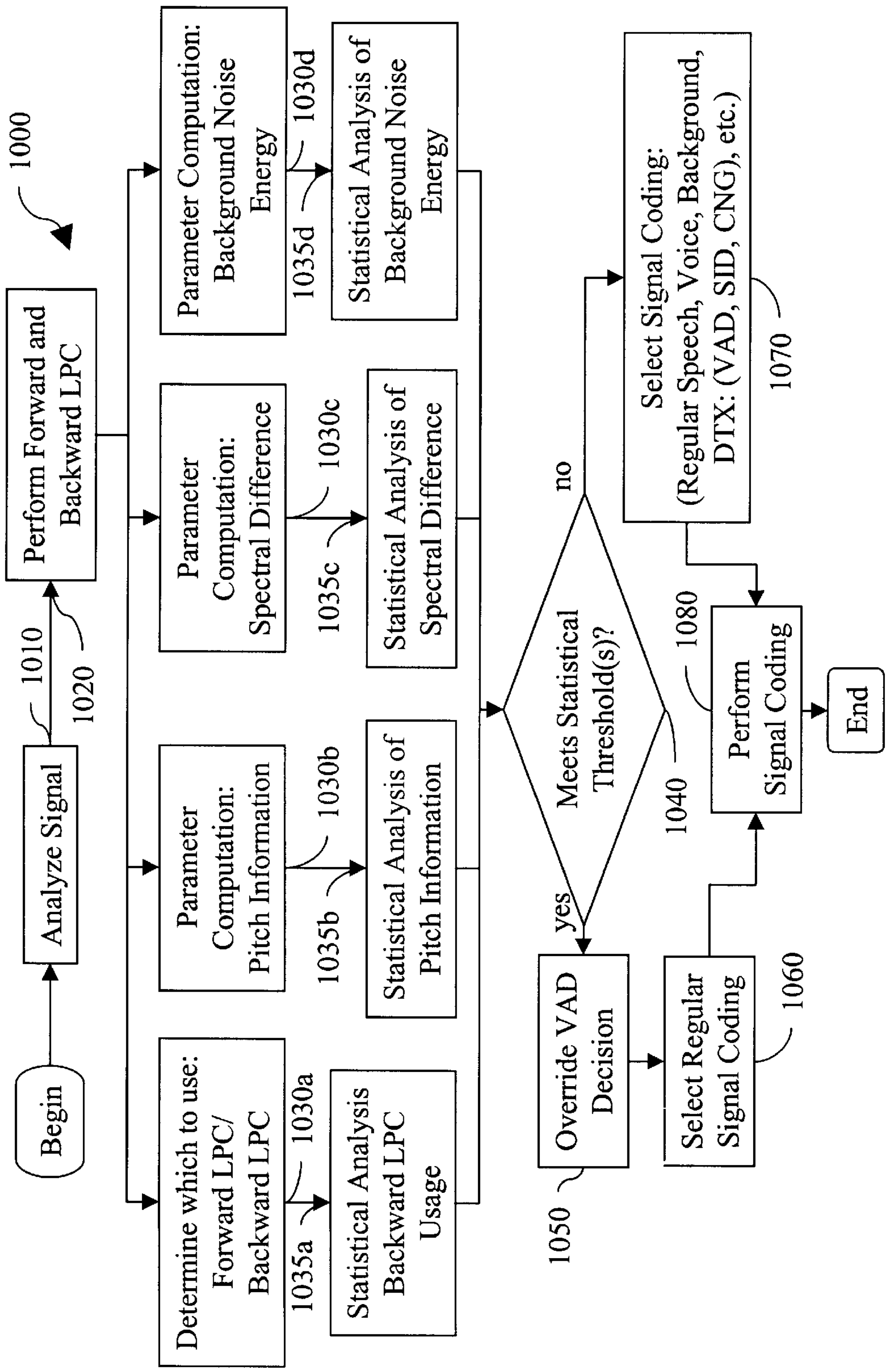
FIG. 10 is a functional block diagram illustrating a speech signal coding method that performs speech signal coding, dependent upon the statistical analysis of any one of a variety of different parameters, in accordance with the present invention.

FIG. 10 is a functional block diagram illustrating a signal coding method 1000 that performs speech signal coding, dependent upon the statistical analysis of any one of a variety of different parameters, in accordance with the present invention. The signal is analyzed in a block 1010. In certain embodiments of the invention, the signal analysis of the block 1010 is performed using a perceptual weighting filter or weighting filter applied to non-perceptual characteristics of the signal. In a block 1020, forward linear prediction and backward linear prediction is performed on the signal in accordance with various techniques employed in signal coding and speech coding.

Numerous computations are performed on the signal in accordance with the present invention as illustrated by the method 1000 to extract various parameters. For instance, a block 1030*a* determines whether the forward linear prediction or the backward linear prediction is to be used to perform the signal coding of the signal. Subsequently, in a block 1035*a*, statistical analysis of the usage of the backward linear prediction is performed against a predetermined threshold. In certain embodiments of the invention, an output flag is generated on a frame by frame basis within the block 1030*a* that indicates the usage of either forward linear prediction or backward linear prediction. The statistical analysis is performed over a window of a predetermined number of 'N' consecutive frames of the speech signal. A predetermined number of 64 frames is optimal in certain applications of the invention.

Similarly, in a block 1030*b*, parameter computation is performed on the signal to extract pitch information. Subsequently, in a block 1035*b*, statistical analysis of the pitch information of the signal is performed. Similarly, an output flag is generated a frame by frame basis within the block 1030*b* that indicates the pitch lag smoothness and voicing strength indicator. The statistical analysis is performed over a window of a predetermined number of 'N' consecutive frames of the speech signal. A predetermined number of 64 frames is optimal in certain applications of the invention.

Similarly, in a block 1030*c*, parameter computation is performed on the signal to extract spectral information including spectral differences of various portions of the signal. Subsequently, in a block 1035*b*, statistical analysis of the spectral difference of the signal is performed. Similarly, in a block 1630*d*, parameter computation is performed on the signal to extract background noise energy of the signal. Subsequently, in a block 1035*b*, statistical analysis of the background noise energy of the signal is performed. Any number of the various embodiments of the invention described in the above references FIGS. 1–9 are used to perform the parameter computational blocks 1030*a*, 1030*b*, 1030*c*, and 1030*d*, and the statistical analysis blocks 1035*a*, 1035*b*, 1035*c*, and 1035*d* without departing from the scope and spirit of the invention.

A decision block 1040 directs the speech coding method 1000 to select a signal coding from among a predetermined number of methods to perform signal coding, as shown in a block 1070 if the predetermined statistical thresholds that are determined in the statistical analysis blocks 1035*a*, 1035*b*, 1035*c*, and 1035*d* are met. Certain examples of methods to perform signal coding in the block 1070 include, but are not limited to, regular signal coding, substantially voice-like signal coding, substantially background-like signal coding, discontinued transmission (DTX) signal coding which itself includes voice activity detection (VAD), silence description coding (SID), and comfort noise generation (CNG) signal coding. Subsequently, the signal coding is actually performed in a block 1080.

Alternatively, if the statistical analysis of the statistical analysis blocks 1035*a*, 1035*b*, 1035*c*, and 1035*d* does in fact meet the predetermined statistical threshold as decided in the decision block 1040, any voice activity detection (VAD) decision that is employed in the signal coding method 1000 is overridden in. a block 1050. In a block 1060, the signal is coded using a selected regular signal coding, irrespective of any other characteristics of the signal. The regular signal coding that is selected in the block 1060 maintains a high perceptual quality of the signal, even in the presence of a substantially music-like signal in the signal. Subsequently, the signal coding is actually performed in the block 1080.

One particular method of employing the invention as described above is to utilize the following computer code, written in the C programming language. The C programming language is well known to those having skill in the art of signal coding, speech coding, and speech processing. In certain embodiments, the following C programming language code is performed within the statistical analysis blocks 1035*a*, 1035*b*, 1035*c*, and 1035*d*, the decision block 1040, and the voice activity detection (VAD) override block 1050 of FIG. 10.

```
#define    sqr(a)    ((a)*(a))
void musdetect(
        int rate,
        FLOAT Energy,
        FLOAT *rc,
        int *lags,
        FLOAT *pgains,
        int stat_flg,
        int frm_count,
        int prev_vad,
        int *Vad,
        FLOAT LLenergy)
{
  int i;
  static int count_music=0;
  static FLOAT Mcount_music=(F)0.0;
  static int count_consc=0;
  FLOAT sum1, sum2,std;
  static FLOAT MeanPgain = (F)0.5;
  short PFLAG1, PFLAG2, PFLAG;
  static int count_pflag=0;
  static FLOAT Mcount_pflag=(F)0.0;
  static int count_consc_pflag=0;
  static int count_consc_rflag=0;
  static FLOAT mrc[10]={(F)0.0,(F)0.0, (F)0.0, (F)0.0, (F)0.0,
     (F)0.0, (F)0.0, (F)0.0, (F)0.0, (F)0.0};
  static FLOAT MeanSE = (F)0.0;
  FLOAT pderr, Lenergy , SD, tmp_vec [10];
  FLOAT Thres;
  pderr =(F)1.0;
  for (i=0; i< 4; i++) pderr *= ((F)1.0 - rc[i]*rc[i]);
  dvsub(mrc,rc,tmp_vec,10);
  SD = dvdot(tmp_vec, tmp_vec,10);
  Lenergy = (F)10.0*(FLOAT)log10(pderr*Energy/(F)240.0 +EPSI);
  if( *Vad == NOISE ){
     dvwadd(mrc, (F)0.9,rc, (F)0.1,mrc,10);
     MeanSE = (F)0.9*MeanSE + (F)0.1*Lenergy;
  }
  sum1 =(F)0.0;
  sum2 =(F)0.0;
  for(i=0; i<5; i++){
     sum1 += (FLOAT) lags [i];
     sum2 += pgains[i];
  }
  sum1 = sum1/(F)5.0;
  sum2 = sum2/(F)5.0;
  std = (F)0.0;
  for(i=0; i<5; i++) std += sqr(((FLOAT) lags[i] - sum1));
  std = (FLOAT)sqrt(std/(F)4.0);
  MeanPgain = (F)0.8*MeanPgain + (F)0.2*sum2;
  if ( rate == G729D)
     Thres = (F)0.73;
  else
     Thres = (F)0.63;
  if ( MeanPgain > Thres)
```

-continued

```
    PFLAG2 =1;
  else
    PFLAG2 =0;
  if ( std < (F)1.30 && MeanPgain > (F)0.45)
    PFLAG1 =1;
  else
    PFLAG1 =0;
  PFLAG= (INT16) ( ((INT16)prev_vad & (INT16) (PFLAG1 | PFLAG2
)) | (INT16) (PFLAG2));
  if( rc[1] <= (F)0.45 && rc[1] >= (F)0.0 && MeanPgain <
(F)0.5)
    count_consc_rflag++;
  else
    count_consc_rflag =0;
  if( stat_flg== 1 && (*Vad == VOICE))
    count_music++;
  if ((frm_count%64) == 0 ) {
    if( frm_count == 64)
      Mcount_music = (FLOAT)count_music;
    else
      Mcount_music = (F)0.9*Mcount_music +
(F)0.1*(FLOAT)count_music;
  }
  if( count_music == 0)
    count_consc++;
  else
    count_consc = 0;
  if( count_consc > 500 || count_consc_rflag > 150)
Mcount_music = (F)0.0;
  if ((frm_count%64) == 0)
    count_music = 0;
  if( PFLAG== 1 )
    count_pflag++;
  if ((frm_count%64) == 0 ) {
    if( frm_count == 64)
      Mcount_pflag = (FLOAT)count_pflag;
    else{
      if( count_pflag > 25)
        Mcount_pflag = (F)0.98*Mcount_pflag +
(F)0.02*(FLOAT)count_pflag;
      else if( count_pflag > 20)
        Mcount_pflag = (F)0.95*Mcount_pflag +
(F)0.05*(FLOAT)count_pflag;
      else
        Mcount_pflag = (F)0.90*Mcount_pflag +
(F)0.10*(FLOAT)count_pflag;
    }
  }
  if( count_pflag == 0)
    count_consc_pflag++;
    else
      count_consc_pflag = 0;
    if( count_consc_pflag > 100 || count_consc_rflag > 150)
Mcount_pflag = (F)0.0;
  if ((frm_count%64) == 0)
    count_pflag = 0;
  if (rate == G729E) {
    if( SD > (F)0.15 && (Lenergy -MeanSE)> (F)4.0 &&
(LLenergy> 50.0) )
      *Vad =VOICE;
    else if( (SD > (F)0.38 || (Lenergy -MeanSE)> (F)4.0 ) &&
(LLenergy> 50.0))
      *Vad =VOICE;
    else if( (Mcount_pflag >= (F)10.0 || Mcount_music >=
(F)5.0 || frm_count < 64)
      && (LLenergy> 7.0))
      *Vad =VOICE;
  }
  return;
}
```

From other perspectives of the invention, music detection is viewed as a new function when performed in accordance with the invention. When the G.729 Annex B discontinued transmission (DTX) is performed in conjunction with a set of the G.729 family of speech coders (G.729 Main Body, G.729Annex D, G.729 Annex E) that includes the G.729 Annex E speech coder, the music detection is performed immediately following any voice activity detection (VAD) and forces the voice activity detection (VAD) decision to "speech" during music segments.

It is active only during Annex E operation, though its parameters are updated continuously independently of bit-rate mode.

The music detection method corrects the decision from the Voice Activity Detection (VAD) in the presence of substantially music-like signals. It is used in conjunction with Annex E during Annex B DTX operation, i.e. in Discontinuous Transmission mode. The music detection is based on the following parameters, among others, as defined below:

Vad_dec, VAD decision of the current frame.

PVad_dec, VAD decision of the previous frame.

Lpc_mod, flag indicator of either forward or backward adaptive LPC of the previous frame.

Rc, reflection coefficients from LPC analysis.

Lag_buf, buffer of corrected open loop pitch lags of last 5 frames.

Pgain_buf, buffer of closed loop pitch gain of last 5 subframes.

Energy, first autocorrelation coefficient R(0) from LPC analysis.

LLenergy, normalized log energy from VAD module.

Frm count, counter of the number of processed signal frames.

Rate, selection of speech coder

The method of this particular embodiment of the invention has primarily two main parts, namely, a part that performs computation of relevant parameters, and a part that performs a classification based on parameters. Firstly, the computation of relevant parameters is presented below. Secondly, the classification performed by the method based on parameters is described.

The following section describes the computation of the parameters used by a decision module employed in accordance with the present invention.

Partial Normalized Residual Energy:

A partial normalized residual energy of the speech signal is calculated as shown below.

$$Lenergy = 10\log_{10}\left(\prod_{i=1}^{4}(1 - Rc(i)^2)Energy/240\right)$$

Spectral Difference and Running Mean of Partial Normalized Residual Energy of Background Noise:

A spectral difference measure between the current frame reflection coefficients Rc and the running mean reflection coefficients of the background noise mRc is calculated as shown below.

$$SD = \sum_{i=1}^{10}(Rc(i) - mRc(i))^2$$

The running means $\overline{mrc}$ and mLenergy are updated as follows using the VAD decision Vad_deci that was generated by the VAD module.

if Vad_deci == NOISE{

-continued $$\overline{mrc} = 0.9\overline{mrc} + 0.1\overline{rc}$$

$$mLenergy = 0.9mLenergy + 0.1Lenergy$$

}

Open loop Pitch Lag Correction for Pitch Lag Buffer Update:

An open loop pitch lag $T_{op}$ is corrected to prevent pitch doubling or tripling is calculated as follows:

$$avg\_lag = \sum_{i=1}^{4} Lag\_buf(i)/4$$

if $(abs(T_{op}/2 - avg\_lag) <= 2)$ $Lag\_buf(5) = T_{op}/2$ else if $(abs(T_{op}/3 - avg\_lag) <= 2)$ $Lag\_buf(5) = T_{op}/3$ else $Lag\_buf(5) = T_{op}$ It should be noted that the open loop pitch lag $T_{op}$ is not modified and is the same as derived by the open loop analysis.

Pitch Lag Standard Deviation

A pitch lag standard deviation is calculated as shown below.

$$std = \sqrt{\frac{Var}{4}}$$

where $$Var = \sum_{i=1}^{i=5} (Lag\_buf(i) - \mu)^2 \text{ and } \mu = \sum_{i=1}^{i=5} (Lag\_buf(i)/5)$$

Running Mean of Pitch Gain

A running mean of the pitch gain is calculated as shown below.

$$mPgain = 0.8\,mPgain + 0.2\theta, \text{ where } \theta = \sum_{i=1}^{i=5} (Pgain\_buf(i)/5)$$

The pitch gain buffer Pgain_buf is updated after the subframe processing with a pitch gain value of 0.5 if Vad_deci=NOISE, and otherwise with the quantized pitch gain.

Pitch Lag Smoothness and Voicing Strength Indicator

A pitch lag smoothness and voicing strength indicator Pflag is generated using the following logical steps:

First, two intermediary logical flags Pflag1 and Pflag2 are obtained as, if (std<1.3 and mPgain>0.45) set Pflag1=1 else 0 if (mPgain>Thres) set Pflag2=1 else 0, where Thres=0.73 if Rate=G729D, otherwise Thres=0.63

Finally, Pflag is determined from the following:

if ((PVad_dec==VOICE and (Pflag1==1 or Pflag2==1) or (Pflag2 =1)

set Pflag=1 else 0

Stationarity Counters

A set of counters are defined and updated as follows:

a) count_consc_rflag tracks the number of consecutive frames where the $2^{nd}$ reflection coefficient and the running mean of the pitch gain satisfy the following condition:

if (Rc(2)<0.45 and Rc(2)>0 and mPgain<0.5)
    count_consc_rflag=count_consc_rflag+1
else
    count_consc_rflag=0 b) count_music tracks the number of frames where the previous frame uses backward adaptive LPC and the current frame is "speech" ( according to the VAD) within a window of 64 frames.

if (Lpc_mod==1 and Vad_deci==VOICE)
    count_music=count_music+1

Every 64 frames, a running mean of count_music, mcount_music is updated and reset to zero as described below:

```
if ((Frm_count%64) == 0){
if (Frm_count == 64)
   mcount_music = count_music
else
   mcount_music = 0.9mcount_music + 0.1count_music
}
```

The updating data, count_music, comes from the statistical analysis that is performed over the predetermined number of 'N' frames, i.e., 64 frames in the optimal case in certain embodiments of the invention as shown above in the block 1035*a* of FIG. 10.

c) count_consc tracks the number of consecutive frames where the count_music remains zero:

if (count_music==0)
    count_consc=count_consc+1
else
    count_consc=0 if (count_consc>500 or count_consc_rflag>150) set count_music=0 count_music in b) is reset to zero every 64 frames after the update of the relevant counters. The logic in c) is used to reset the running mean count_music.

d) count_pflag tracks the number of frames where Pflag=1, within a window of 64 frames.

if (Pflag==1)
    count_pflag=count_pflag+1

Every 64 frames, a running mean of count_pflag, mcount_pflag, is updated and reset to zero as described below:

```
if ((Frm_count%64) == 0){
if (Frm_count == 64)
   mcount_pflag = count_pflag
else{
if (count_pflag > 25)
   mcount_pflag = 0.98mcount_pflag + 0.02count_pflag
else (count_pflag > 20)
   mcount_pflag = 0.95mcount_pflag + 0.05count_pflag
else
   mcount_pflag = 0.9mcount_pflag + 0.1count_pflag
   }
}
```

The updating data, count_pflag, comes from the statistical analysis that is performed over the predetermined number of 'N' frames, i.e., 64 frames in the optimal case in certain embodiments of the invention as shown above in the block 1035*b* of FIG. 10.

e) count_consc_flag tracks the number of consecutive frames satisfying the following condition.

if (count_pflag==0)
count_consc_pflag=count_consc_pflag+1
else
count_consc_pflag=0 if (count_consc_pflag>100 or count_consc_rflag>150) set mcount_pflag=0 count_pflag is reset to zero every 64 frames. The logic in e) is used to reset the running mean of count_pflag.

The classification performed by the method based on parameters is described below. Based on the estimation of the above parameters, the VAD decision Vad_deci from the VAD module is reverted if the following conditions are satisfied:

```
if ( Rate = G729E){
if ( SD > 0.15 and (Lenergy − mLenergy) > 4 and LLenergy > 50)
  Vad_deci = VOICE
else if (( SD > 0.38 or (Lenergy − mLenergy) > 4) and LLenergy > 50)
  Vad_deci = VOICE
else if ((mcount_pflag >= 10 or mcount_music >= 1.0938 or Frm_
count < 64)
    and LLenergy > 7)
  Vad_deci = VOICE
}
```

Note that the music detection function is called all the time regardless of the operational coding mode in order to keep the memories current. However, the VAD decision Vad_deci is altered only if the integrated G.729 is operating at 11.8 kbit/s (Annex E). It should be noted that the music detection only has the capability to change the decision from "non-speech" to "speech" and not vice versa.

Figure 11:
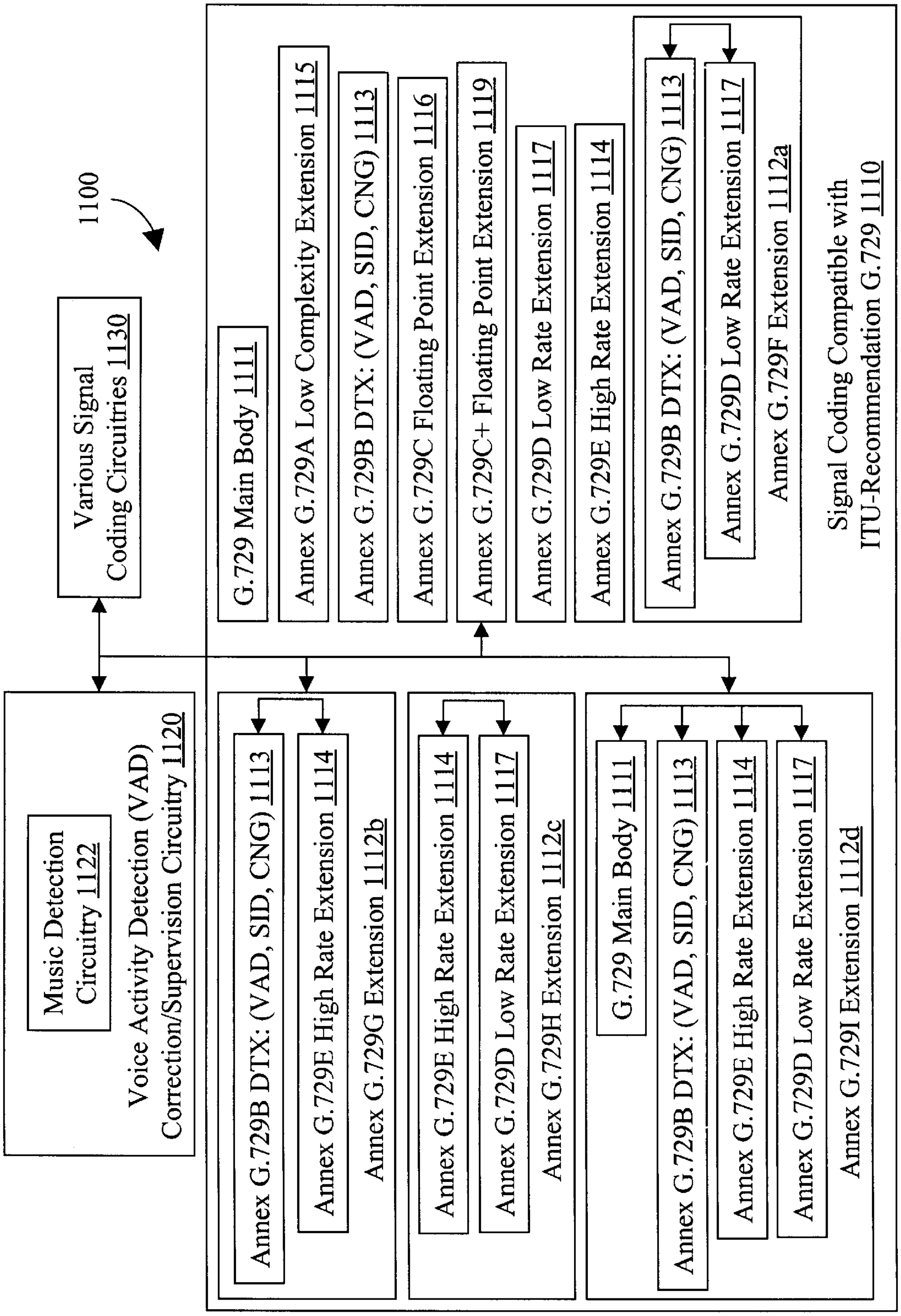
FIG. 11 is a system diagram illustrating another embodiment of an extended signal coding system built in accordance with the present invention.

FIG. 11 is a system diagram illustrating another embodiment of an extended signal. coding system 1100 built in accordance with the present invention. The extended signal coding system 1100 contains, among other things, a signal coding compatible with ITU-Recommendation. G.729 1110, a voice activity detection (VAD) correction/supervision circuitry 1120, and various speech signal coding circuitries 1130. The signal coding compatible with ITU-Recommendation G.729 1110 contains numerous annexes in addition to a G.729 main body 1111. The signal coding compatible with ITU-Recommendation G.729 1110 includes, among other things, the G.729 main body 1111, an annex G.729A low complexity extension 1115, an annex G.729B discontinued transmission (DTX: (VAD, SID, CNG)) 1113, an annex G.729C floating point extension 1116, an annex G.729C+ floating point extension 1119, an annex G.729D low rate extension 1117, an annex G.729E high rate extension 1114, an annex G.729F **1112*a*, an annex G.729G 1112*b*, an annex G.729H 1112*c*, and an annex G.729I 1112*d***.

The annex G.729F **1112*a* itself contains, among other things, the annex G.729B discontinued transmission (DTX: (VAD, SID, CNG)) 1113 and the annex G.729D low rate extension 1117. The annex G.729G 1112*b* itself contains, among other things, the annex G.729B discontinued transmission (DTX: (VAD, SID, CNG)) 1113 and the annex G.729E high rate extension 1114. The annex G.729H 1112*c* itself contains, among other things, the annex G.729E high rate extension 1114 and the annex G.729D low rate extension 1117. The annex G.729I fixed point extension 1112d itself contains, among other things, the G.729 main body 1111, the annex G.729B discontinued transmission (DTX: (VAD, SID, CNG)) 1113, the annex G.729E high rate extension 1114, and the annex G.729D low rate extension 1117**.

The voice activity detection (VAD) correction/supervision circuitry 1120 itself contains, among other things, a music detection circuitry 1122 to detect the existence of a substantially music-like signal in performing signal coding in accordance with the present invention. The voice activity detection (VAD) correction/supervision circuitry 1120 and its embedded music detection circuitry 1122 operate in conjunction with the annex G.729C+ floating point extension 1119, the annex G.729G **1112*b*, and the annex G.729I fixed point extension 1112d to perform speech coding in accordance with the invention. Additional annexes, not yet developed, that are operable in conjunction with the voice activity detection (VAD) correction/supervision circuitry 1120 and its embedded music detection circuitry 1122 are also envisioned within the signal coding that is performed using the extended signal coding system 1100. In certain embodiments of the invention, as described above in FIG. 10 that illustrates the method 1000, there are only certain instances when signal coding is performed such that the voice activity detection (VAD) correction/supervision circuitry 1120 overrides a voice activity detection (VAD). decision performed in accordance with the present invention. For example, to maintain a high perceptual quality of certain signals, such as substantially music-like signals, the voice activity detection (VAD) correction/supervision circuitry 1120 overrides the voice activity detection (VAD) decision that often employs a reduced data transmission rate, thereby substantially degrading the perceptual quality of the signal, particularly during the existence of a substantially music-like signal within the signal. The voice activity detection (VAD) correction/supervision circuitry 1120 is, in certain embodiments of the invention, a voice activity detection circuitry that provides additional functionality, such as alternative operation upon the detection of a substantially music-like signal using the music detection circuitry 1122 (described in further detail below) that is embedded within the extended signal coding system 1100**.

All of the annexes described above provide additional performance characteristics to the G.729 main body 1111, and are known to those having skill in the art of signal coding, signal processing, speech coding, and speech processing. For example, the annex G.729B discontinued transmission (DTX: (VAD, SID, CNG)) 1113 provides increased performance, in that, a lower data transmission rate is employed borrowing upon the discontinued transmission (DTX) mode of operation in the absence of active voiced speech in a signal. The annex G.729B discontinued transmission (DTX: (VAD, SID, CNG)) 1113 itself performs voice activity detection, silence description coding, and comfort noise generation, known to those having skill in the art of signal coding, signal processing, speech coding, and speech processing.

In certain embodiments of the invention, the voice activity detection (VAD) correction/supervision circuitry 1120 performs the traditional voice activity detection of the annex G.729B discontinued transmission (DTX: (VAD, SID, CNG)) 1113, in addition to its correction/supervision functions. The voice activity detection (VAD) correction/supervision circuitry 1120 itself contains, among other things, a music detection circuitry 1122. The music detection circuitry 1122 operates to detect a substantially music-like signal in a signal that is processed using the extended signal coding system 1100. The voice activity detection (VAD) correction/supervision circuitry 1120 additional is capable to detect the presence of a substantially music-like signal in a signal. The various speech signal coding circuitries 1130 operate within the extended signal coding system 1100 to perform the actual coding of the signal in accordance with the invention and in accordance with the signal coding compatible with ITU-Recommendation G.729 1110.

In certain embodiments of the invention, the various signal coding circuitries 1130 contain, among other things, the noise compression circuitry 231, the discontinued transmission (DTX) circuitry 232, the background noise coding circuitry 233, the voice coding circuitry 234, the comfort noise generation circuitry 235, and the regular speech coding circuitry 236 as shown in the embodiment of the invention illustrated in the FIG. 2. The various signal coding circuitries 1130 are employed in certain embodiments of the invention to perform the signal coding dependent on various characteristics in the signal. Other methods of signal coding known to those having skill in the art of signal coding, signal processing, speech coding, and speech signal processing are intended within the scope and spirit of the invention.

In certain embodiments of the invention, it is a classification that is performed by the various speech signal coding circuitries 1130, in conjunction with at least one of the annex G.729C+ floating point extension 1119, the annex G.729G **1112*b*, and the annex G.729I fixed point extension 1112d, that is used to select the appropriate speech coding. One specific embodiment of the invention that performs speech coding in according with at least one of the annex G.729C+ floating point extension 1119, the annex G.729G 1112*b*, and the annex G.729I fixed point extension 1112d is illustrated above in the method 1000 shown in FIG. 10**.

The voice activity detection (VAD) correction/supervision circuitry 1120 of the extended signal coding system 1100 is implemented, among other reasons, to overcome the problems associated with traditional voice activity detection (VAD) circuitry that undesirably classifies substantially music-like signals as background noise signals. The voice activity detection (VAD) correction/supervision circuitry 1120, in using any one the annex G.729C+floating point extension 1119, the annex G.729G **1112*b*, and the annex G.729I 1112d, interfaces ideally with the signal coding compatible with ITU-Recommendation G.729 1110. The voice activity detection (VAD) correction/supervision circuitry 1120 ensures, among other things, that the annex G.729E high rate extension 1114** is allocated to handle signals having a substantially music-like characteristic.

The voice activity detection (VAD) correction/supervision circuitry 1120 intervenes in the event of an improper decision by a conventional voice activity detection (VAD) circuitry in wrongly classifying a substantially music-like signal as background noise. Depending upon the classification of a speech signal, using the annex G.729E high rate extension 1114, and some additional statistical analysis that is performed dependent upon that classification, the voice activity detection (VAD) correction/supervision circuitry 1120 is able to undo any wrong decisions performed by the conventional voice activity detection (VAD) circuitry and ensure that the annex G.729E high rate extension 1114 accommodates any substantially music-like signals.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. An extended signal codec that performs signal coding of a speech signal, the extended signal codec comprising:

a background noise speech signal coding module;

a music speech signal coding module;

a voice activity detection module configured to generate a decision signal, wherein the decision signal is of a first type if the voice activity detection module detects no voice activity in the speech signal or of a second type if the voice activity detection module detects voice activity in the speech signal, and wherein the first type is associated with selection of the background noise speech signal coding module and the second type is associated with selection of the music speech signal coding module; and a voice activity detection correction and supervision module configured to receive the decision signal, wherein if the voice activity module generates the decision signal of the first type, the voice activity detection correction and supervision module overrides the decision signal of the first type and generates a new decision signal of the second type if the voice activity detection correction and supervision module detects at least one characteristic of the speech signal indicative of a music signal in the speech signal.

2. The extended signal codec of claim 1, wherein the voice activity detection correction and supervision does not override the decision signal if the decision signal is of the first type.

3. The extended signal codec of claim 1, wherein the at least one characteristic of the speech signal corresponds to a pitch information.

4. The extended signal codec of claim 1, wherein the at least one characteristic of the speech signal corresponds to a background noise level.

5. The extended signal codec of claim 1, wherein the at least one characteristic of the speech signal corresponds to a measurement of a spectral evolution.

6. The extended signal codec of claim 1, wherein the at least one characteristic of the speech signal relates to forward linear prediction coding.

7. The extended signal codec of claim 1, wherein the at least one characteristic of the speech signal relates to backward linear prediction coding.

8. The extended signal codec of claim 1, wherein the background noise speech signal coding module is compatible with the ITU-Recommendation G.729B standard and the music speech signal coding module is compatible with the ITU-Recommendation G.729E standard.

9. A signal processor that performs correction and supervision of a voice activity detection decision, the signal processor comprising:

an encoder circuitry that analyzes a signal, the encoder circuitry also performs forward linear prediction coding and backward linear prediction coding on the signal;

the signal processor computes a plurality of parameters corresponding to the signal, the plurality of parameters comprising a pitch parameter, a spectral difference parameter, and a background noise energy parameter, the signal processor also statistically analyzes the plurality of parameters corresponding to the signal and compares the statistical analysis of the plurality of parameters corresponding to the signal to at least one predetermined threshold, the at least one predetermined threshold is stored in the encoder circuitry; and the signal processor overrides a voice activity detection decision when the statistical analysis of the plurality of parameters meets the at least one predetermined threshold.

10. The signal processor of claim 9, wherein the signal processor is contained within an extended speech codec.

11. The signal processor of claim 9, wherein the signal processor selects at least one source coding mode from among a plurality of signal coding modes when the statistical analysis of the plurality of parameters meets the at least one predetermined threshold.

12. The signal processor of claim 11, wherein the signal processor selects at least one additional source coding mode from among the plurality of signal coding modes when the statistical analysis of the plurality of parameters does not meet the at least one predetermined threshold.

13. The signal processor of claim 12, wherein the at least one additional source coding mode is compatible with the ITU-Recommendation G.729 standard.

14. The signal processor of claim 9, wherein the at least one source coding mode is compatible with the ITU-Recommendation G.729 standard.

15. A method that performs correction and supervision of a voice activity detection decision, the method comprising:

analyzing a signal;

performing forward linear prediction coding and backward linear prediction coding on the signal;

computing a plurality of parameters corresponding to the signal, the plurality of parameters comprising a pitch parameter, a spectral difference parameter, and a background noise energy parameter;

statistically analyzing the plurality of parameters corresponding to the signal;

comparing the statistical analysis of the plurality of parameters corresponding to the signal to at least one predetermined threshold; and overriding a voice activity detection decision when the statistical analysis of the plurality of parameters meets the at least one predetermined threshold.

16. The method of claim 15, wherein the method is performed within an extended speech codec.

17. The method of claim 15, further comprising selecting at least one source coding mode from among a plurality of signal coding modes when the statistical analysis of the plurality of parameters meets the at least one predetermined threshold.

18. The method of claim 17, further comprising selecting at least one additional source coding mode from among the plurality of signal coding modes when the statistical analysis of the plurality of parameters does not meet the at least one predetermined threshold.

19. The method of claim 18, wherein the at least one source coding mode is compatible with the ITU-Recommendation G.729 standard.

20. The method of claim 18, wherein the at least one additional source coding mode is compatible with the ITU-Recommendation G.729 standard.

21. A signal processor that performs correction and supervision of a voice activity detection decision that is made on a signal, the signal processor comprising:

a signal processor that analyzes a signal, the signal having a plurality of frames, the signal processor generates a voice activity detection decision upon analysis of the signal;

the signal processor performs statistical analysis using a predetermined number of frames of the signal, the predetermined number of frames of the signal are selected from the plurality of frames of the signal;

the signal processor updates at least one running, mean upon performing the statistical analysis of the predetermined number of frames of the signal using at least one characteristic corresponding to the signal; and a voice activity detection correction and supervision circuitry that overrides a voice activity detection decision when the statistical analysis of the plurality of parameters meets at least one predetermined threshold.

22. The signal processor of claim 21, wherein the at least one characteristic corresponding to the signal is a pitch characteristic.

23. The signal processor of claim 21, wherein the signal processor performs at least one of forward linear prediction coding and backward linear prediction coding on the signal; and the at least one characteristic corresponding to the signal is the coding of at least one of the forward linear prediction coding and the backward linear prediction coding that is performed on the signal.

24. The signal processor of claim 21, wherein the signal processor performs at least one of forward linear prediction coding and backward linear prediction coding on the signal; and the at least one characteristic corresponding to the signal is performing a statistical analysis on a usage of the backward linear prediction coding that is performed on the signal.

25. The signal processor of claim 21, wherein the predetermined number of frames of the signal is sixty-four frames of the signal.

26. The signal processor of claim 21, wherein the signal processor selects the predetermined number of frames of the signal using at least one characteristic of the signal.

27. The signal processor of claim 21, wherein the analysis of the signal is compatible with the ITU-Recommendation G.729 standard.

* * * * *